US011413752B2

(12) United States Patent
Takahashi et al.

(10) Patent No.: US 11,413,752 B2
(45) Date of Patent: Aug. 16, 2022

(54) PROGRAMMING ASSISTANCE FOR ROBOTS

(71) Applicant: KABUSHIKI KAISHA YASKAWA DENKI, Kitakyushu (JP)

(72) Inventors: Makoto Takahashi, Fukuoka (JP); Wataru Watanabe, Fukuoka (JP); Yutaro Uchida, Fukuoka (JP); Keita Satsuma, Fukuoka (JP); Hiroshi Hashimoto, Fukuoka (JP)

(*) Notice: Subject to any disclaimer, the term of this patent is extended or adjusted under 35 U.S.C. 154(b) by 176 days.

(21) Appl. No.: 16/833,679

(22) Filed: Mar. 30, 2020

(65) Prior Publication Data

US 2020/0306967 A1    Oct. 1, 2020

Related U.S. Application Data

(60) Provisional application No. 62/906,735, filed on Sep. 27, 2019.

(30) Foreign Application Priority Data

Apr. 1, 2019    (JP) .............................. JP2019-069834

(51) Int. Cl.
*B25J 9/16* (2006.01)
*G05B 15/02* (2006.01)

(52) U.S. Cl.
CPC ............ *B25J 9/1664* (2013.01); *G05B 15/02* (2013.01)

(58) Field of Classification Search
CPC ...... B25J 9/1664; B25J 9/1671; B25J 9/1666; B25J 9/1661; B25J 9/16; B25J 9/1656;
(Continued)

(56) References Cited

U.S. PATENT DOCUMENTS 6,944,584 B1 * 9/2005 Tenney ................ B25J 9/1671
700/17
9,707,680 B1    7/2017 Jules et al.
(Continued)

FOREIGN PATENT DOCUMENTS

JP    S63-303405    12/1988
JP    H5-324022     12/1993
(Continued)

OTHER PUBLICATIONS

Office Action issued in European Patent Application No. 20166385. 3, dated Jul. 22, 2021.
(Continued)

*Primary Examiner* — Mohammad Ali
*Assistant Examiner* — Sheela Rao
(74) *Attorney, Agent, or Firm* — SOEI Patent & Law Firm

(57) ABSTRACT

A programming assistance device includes a program storage unit that stores a first program comprising a first set of time series jobs and stores a second program comprising a second set of time series jobs. Each job of the first program defines at least one operation of a first robot, and the first program is configured to be performed along a shared time line. Additionally, each job of the second program defines at least one operation of a second robot, and the second program is configured to be performed along the shared time line. The programming assistance device further includes circuitry that identifies a verification target time in the shared time line based, at least in part, on a user designation, and generates, based on the first program and the second program, a job image indicating at least one of the first set of time series jobs executed by the first robot and at least one job of the second set of time series jobs executed by the (Continued)

second robot at the verification target time designated in the shared time line.

20 Claims, 18 Drawing Sheets

(58) Field of Classification Search
CPC .......... G05B 15/02; G05B 2219/39135; G05B 19/0426; Y02P 90/02
See application file for complete search history.

(56) References Cited

U.S. PATENT DOCUMENTS

| | | |
|---|---|---|
| 2011/0071676 A1 | 3/2011 | Sanders et al. |
| 2012/0136481 A1 | 5/2012 | Maisonnier et al. |
| 2014/0172167 A1 | 6/2014 | Matsukuma et al. |
| 2015/0379171 A1 | 12/2015 | Kuwahara |
| 2016/0075019 A1 | 3/2016 | Tabuchi et al. |
| 2016/0311112 A1 | 10/2016 | Gustafsson et al. |
| 2017/0097631 A1* | 4/2017 | Linnell .................. B25J 9/1656 |
| 2020/0047339 A1 | 2/2020 | Sawada et al. |

FOREIGN PATENT DOCUMENTS

| | | |
|---|---|---|
| JP | H11-048178 | 2/1999 |
| JP | 2002-120174 | 4/2002 |
| JP | 2006-000954 | 1/2006 |
| JP | 4103057 | 6/2008 |
| JP | 2011-067943 | 4/2011 |
| JP | 2012-528015 | 11/2012 |
| JP | 2014-117781 | 6/2014 |
| JP | 2016-059985 | 4/2016 |
| JP | 2016-093869 | 5/2016 |
| JP | 2017-505239 | 2/2017 |
| WO | 2018/194094 | 10/2018 |

OTHER PUBLICATIONS

Extended Search Report in corresponding European Application No. 20166385.3, dated Aug. 26, 2020.
Office Action issued in Japanese Patent Application No. P2019-069834 dated Feb. 18, 2020 (with English partial translation).
Office Action issued in European Patent Application No. 20166385.3, dated May 30, 2022.

* cited by examiner

PROGRAMMING ASSISTANCE FOR ROBOTS

CROSS-REFERENCE TO RELATED APPLICATION

This application is based upon and claims the benefit of priority from Japanese Patent Application No. 2019-069834, filed on Apr. 1, 2019, and U.S. Provisional Application No. 62/906,735, filed on Sep. 27, 2019 the entire contents of which are incorporated herein by reference.

TECHNICAL FIELD

The present disclosure relates to a programming assistance device, a robot system, and a programming assistance method.

BACKGROUND

Japanese Unexamined Patent Publication No. 2016-59985 discloses a work planning device that comprises a division unit configured to divide an action that includes a plurality of execution entities into a plurality of actions for each execution entity; and an adjustment unit configured to adjust at least one start timing of the plurality of actions. An execution of the plurality of actions is based on dependence information representing dependency between the plurality of actions.

SUMMARY

An example programming assistance device disclosed herein includes a program storage unit configured to store, for each of a plurality of robots, an operation program that includes a plurality of jobs; and a job image generation unit which, if a verification target time is designated by a user, is configured to generate, based on the operation program, a job image indicating jobs executed by the plurality of robots at the verification target time.

An example robot system disclosed herein includes the programming assistance device, a plurality of robots, and a controller configured to control the plurality of robots according to the operation program.

An example programming assistance method disclosed herein comprises storing, for each of a plurality of robots, an operation program that includes each of a plurality of jobs. In response to identifying that a verification target time has been designated by a user, the example method may include generating, based on the operation program, a job image indicating jobs executed by the plurality of robots at the verification target time.

DETAILED DESCRIPTION

Figure 1:
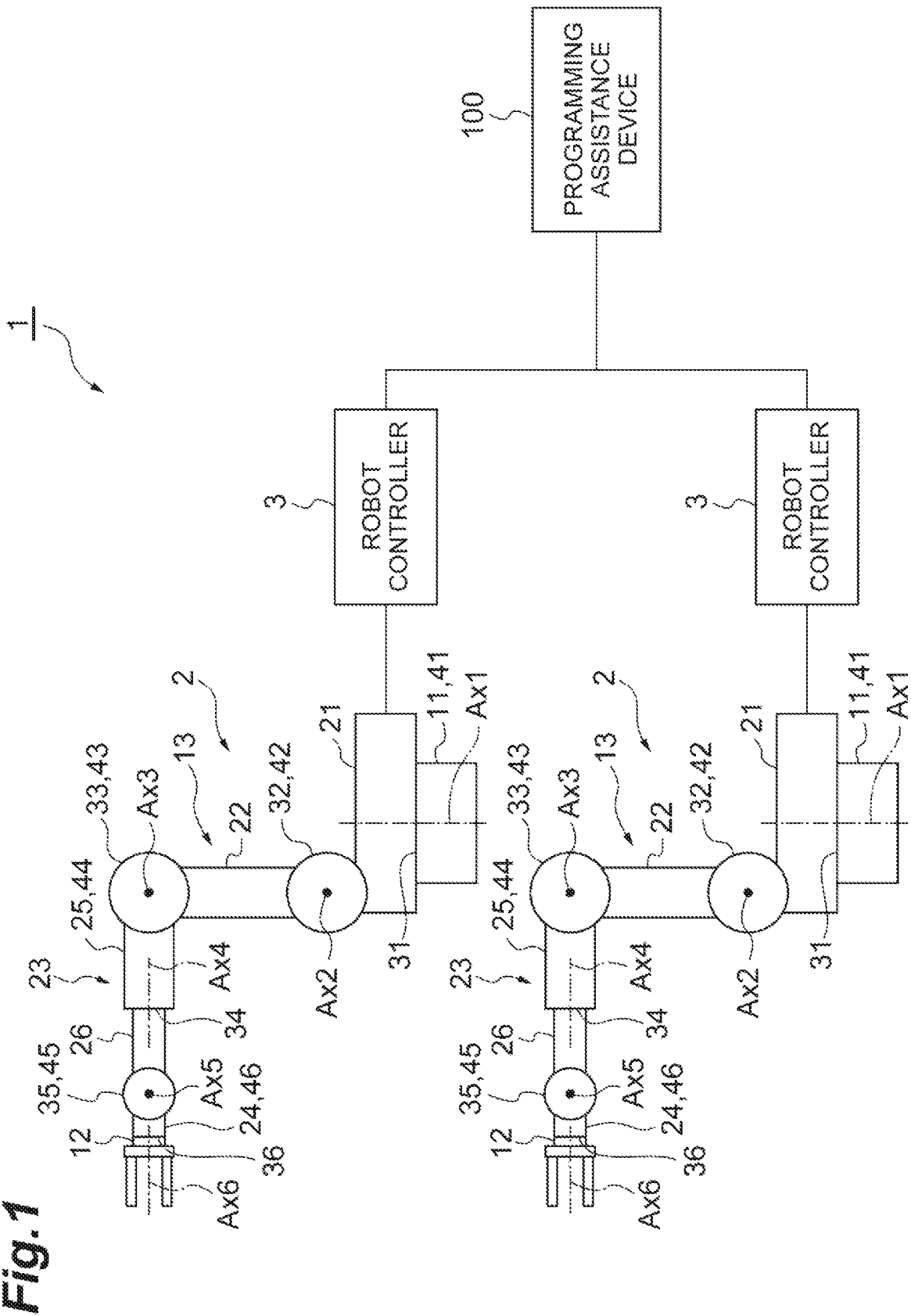
FIG. 1 is a schematic diagram illustrating an example configuration of a robot system.

Hereinafter, with reference to the drawings, the same elements or similar elements having the same function are denoted by the same reference numerals, and redundant description will be omitted.

Robot System

An example robot system 1 that automates various work such as processing, assembly and the like by causing a robot to execute an operation taught by an operator is illustrated in FIG. 1. The robot system 1 comprises a plurality of robots 2, a plurality of robot controllers 3, and a programming assistance device 100. In some examples, the robots 2 may include a first robot and a second robot.

The robots 2 are serial link articulated robots, for example, and execute various work by using a tip part 12 thereof to hold work tools. The robots 2 are 6-axis, vertically articulated robots, for example, and have a base part 11, the tip part 12, and an articulated arm 13.

The base part 11 is installed on a floor, for example, in a work area for the robots 2. The articulated arm 13 connects the base part 11 and the tip part 12. The articulated arm 13 has a plurality of joints and changes the position and attitude of the tip part 12 with respect to the base part 11 by changing the angles of the plurality of joints. For example, the articulated arm 13 has a rotation part 21, a lower arm 22, an upper arm 23, a wrist part 24, and motors 41, 42, 43, 44, 45, and 46.

The rotation part 21 is provided at the top of the base part 11 so as to be capable of rotating about a vertical axis Ax1. Accordingly, the articulated arm 13 has a joint 31 enabling the rotation part 21 to rotate about the axis Ax1.

The lower arm 22 is connected to the rotation part 21 so as to be capable of swinging about an axis Ax2 that intersects (orthogonally, for example) the axis Ax1. Accordingly, the articulated arm 13 has a joint 32 enabling the lower arm 22 to swing about the axis Ax2. Note that, here, intersection also includes cases of a mutually torsional relationship as per so-called three-dimensional intersection. The same is also true hereinbelow.

The upper arm 23 is connected to an end of the lower arm 22 so as to be capable of swinging about an axis Ax3 that intersects the axis Ax1. Accordingly, the articulated arm 13 has a joint 33 enabling the upper arm 23 to swing about the axis Ax3. The axis Ax3 may also be parallel to the axis Ax2.

A tip part 26 of the upper arm 23 is capable of rotating about an axis Ax4 along the center of the upper arm 23. For example, the articulated arm 13 has a joint 34 that enables the tip part 26 of the upper arm 23 to rotate about the axis Ax4. In some examples, the tip part 26 of the upper arm 23 is rotatable with respect to a base part 25.

The wrist part 24 is connected to the tip part 26 of the upper arm 23 so as to be capable of swinging about an axis Ax5 that intersects (orthogonally, for example) the axis Ax4. Accordingly, the articulated arm 13 has a joint 35 that enables the wrist part 24 to swing about the axis Ax5.

The tip part 12 is connected to the tip part of the wrist part 24 so as to be capable of rotating about an axis Ax6 along the center of the wrist part 24. Accordingly, the articulated arm 13 has a joint 36 that enables the tip part 12 to rotate about the axis Ax6.

The motors 41, 42, 43, 44, 45, and 46 drive a plurality of moving parts of the articulated arm 13 in response to the supply of electrical power. For example, the motor 41 causes the rotation part 21 to rotate about the axis Ax1, the motor 42 causes the lower arm 22 to swing about the axis Ax2, the motor 43 causes the upper arm 23 to oscillate about the axis Ax3, the motor 44 causes the tip part 26 of the upper arm 23 to rotate about the axis Ax4, the motor 45 causes the wrist part 24 to swing about the axis Ax5, and the motor 46 causes the tip part 12 to rotate about the axis Ax6. Accordingly, the motors 41, 42, 43, 44, 45, and 46 drive the joints 31, 32, 33, 34, 35, and 36, respectively.

The robots 2 may be configured in other ways to enable adjustment of the position and attitude of the tip part 12 relative to the base part 11. For example, the robots 2 could also be 7-axis robots obtained by adding a redundant axis to the foregoing 6-axis vertically articulated robots. Furthermore, the robots 2 may be so-called scalar robots or parallel link robots.

The plurality of robot controllers 3 control each of the plurality of robots 2 in accordance with a predefined operation program. For example, the robot controllers 3 are control computers that have a driver circuit for controlling the position and speed of the motors 41, 42, 43, 44, 45, and 46 and a communications port.

The operation program includes a plurality of operating commands arranged in chronological order. The operating commands each include a target position and a target attitude for the tip part 12, a movement speed from a current position and a current attitude to the target position and the target attitude, and a method for interpolation from the current position and the current attitude to the target position and the target attitude. One or more examples of the interpolation method include a method of linear or S-shaped interpolation, or the like, between the current position and the current attitude of the tip part 12 and the target position and the target attitude of the tip part 12, and a method of linear or S-shaped interpolation, or the like, between a joint angle (operating angle of the joints 31, 32, 33, 34, 35, and 36) that corresponds to the current position and the current attitude of the tip part 12 and a joint angle that corresponds to the target position and the target attitude of the tip part 12.

The programming assistance device 100 is a device that assists generation of the foregoing operation program. The programming assistance device 100 is configured to store, for each of a plurality of robots 2, of an operation program that includes each of a plurality of jobs and to generate, in response to designating a verification target time by a user, a job image indicating jobs executed by the plurality of robots 2 at the verification target time based on the operation program. In some examples, the programming assistance device 100 may store: a first program comprising time series jobs, each of which defines a motion of the first robot, and a second program comprising time series jobs, each of which defines a motion of the second robot. The programming assistance device 100 may generate the job image indicating a job executed by the first robot and a job executed by the second robot at a verification target time designated by a user in the time line, based on the first program and the second program.

The programming assistance device 100 may generate a job image so as to indicate, for each of the plurality of robots 2, a flowchart in which a plurality of jobs are arranged in execution order, and a marker indicating a part, in the flowchart, that is executed at the verification target time. The job image may be any image enabling a user to recognize jobs executed by the plurality of robots 2 at the verification target time, and therefore may be an image displaying an arrangement of the IDs of the jobs executed by the plurality of robots 2 at the verification target time.

The programming assistance device 100 may also be further configured to generate a simulation image of the plurality of robots 2 at the verification target time by performing an operation simulation based on an operation program and to generate a user interface that includes a job image and the simulation image.

The programming assistance device 100 may also be further configured to generate a time designation image that includes a cursor indicating a position in a direction representing a time axis and to designate the verification target time according to the position of the cursor in the time designation image, and configured to generate a user interface that further includes the time designation image.

Figure 2:
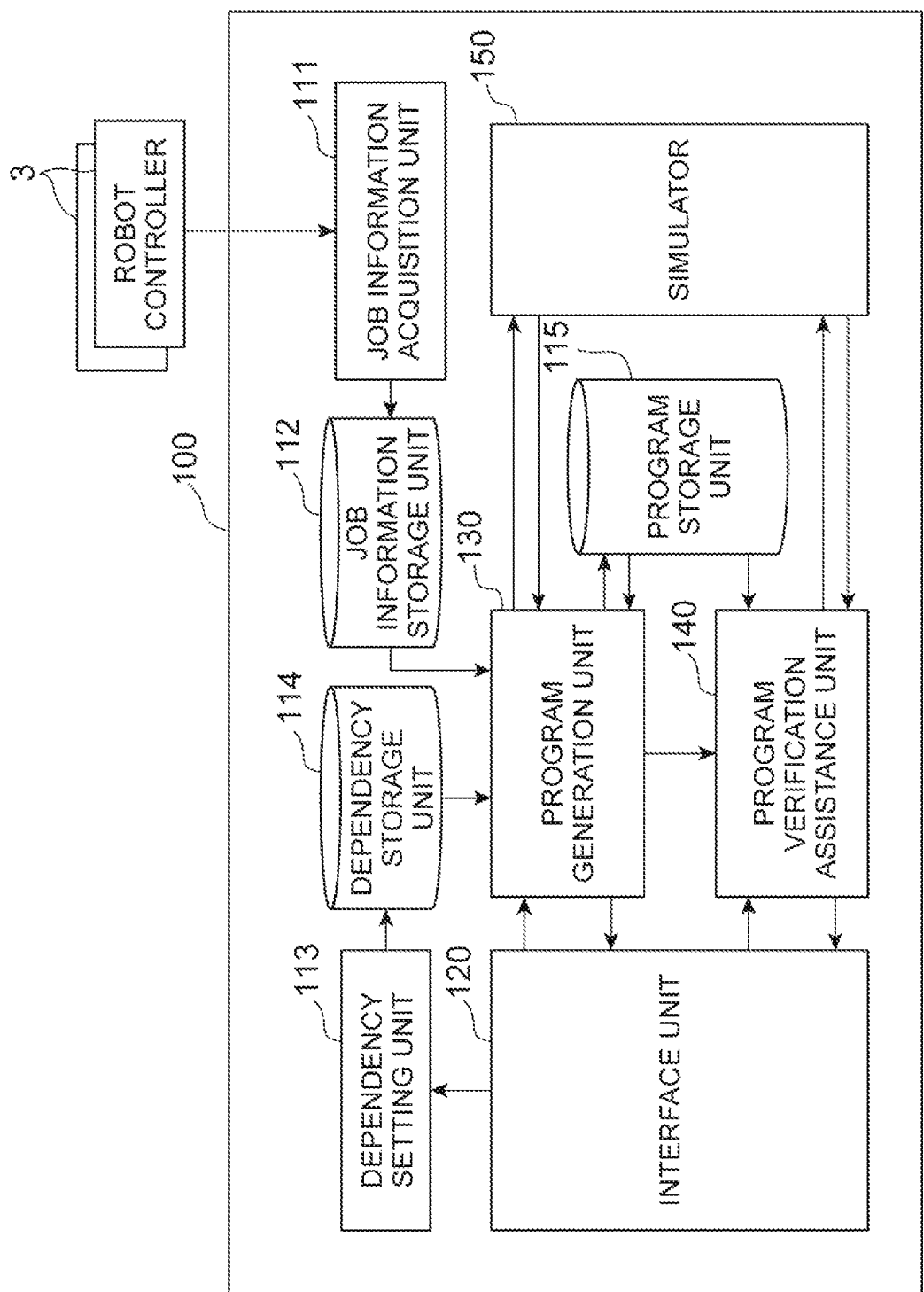
FIG. 2 is a functional block diagram illustrating an example configuration of a programming assistance device.

FIG. 2 is a functional block diagram illustrating an example configuration of the programming assistance device 100. Each of the blocks illustrated by FIG. 2 is referred to hereinbelow as a "functional block". As illustrated in FIG. 2, the programming assistance device 100 includes, as functional blocks, a job information storage unit 112, a job information acquisition unit 111, a dependency setting unit 113, a dependency storage unit 114, an interface unit 120, a program generation unit 130, a program storage unit 115, a program verification assistance unit 140, and a simulator 150.

The job information storage unit 112 stores a plurality of work jobs for the robots 2. A work job is a program that is handled as one part of an operation program and includes at least one operating command. A work job may also include a plurality of operating commands arranged in chronological order. In some examples, the jobs of the first program may include work jobs each of which defines a predetermined work motion of the first robot. The jobs of the second program may include work jobs each of which defines a predetermined work motion of the second robot.

For example, a work job is configured for each unit of work which the robots 2 are caused to execute. One or more examples of a unit of work include work completed in one continuous operation as in the case of welding along a single line. A unit of work may also include a plurality of discontinuous work as in the case of spot welding at a plurality of adjacent points. Numerous operating commands may be included in a work job. Furthermore, the execution time periods for individual operating commands vary according to the movement distance and movement speed. Thus, the execution time periods of a plurality of work jobs stored by the job information storage unit 112 are nonuniform. The work jobs are generated and stored by the robot controllers 3 of the robots 2 according to the work of teaching the robots 2 and the like.

The job information acquisition unit 111 acquires the work jobs stored by each of the plurality of robot controllers 3 and registers, in the job information storage unit 112, work job identification information in association with the content of the work jobs.

The interface unit 120 constitutes a so-called graphical user interface (GUI) to assist the generation of the operation program. For example, the interface unit 120 displays, on a display device, a user interface screen including a plurality of graphical elements and acquires operation information for selecting and moving the graphical elements, and so forth.

Figure 3:
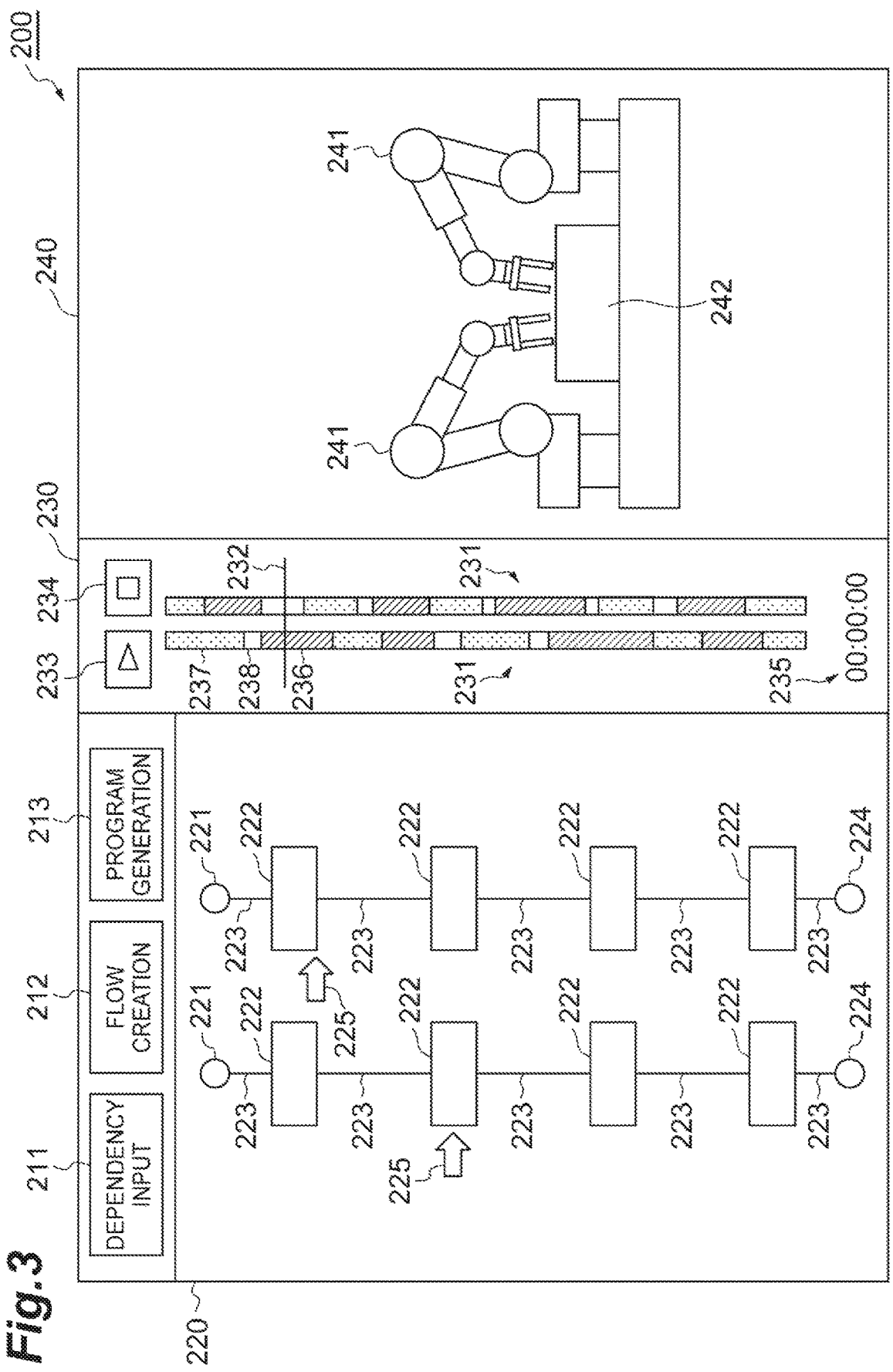
FIG. 3 is a schematic diagram illustrating an example user interface screen.

FIG. 3 is a schematic diagram illustrating an example user interface screen that is displayed by the interface unit 120. As illustrated in FIG. 3, the user interface screen 200 displayed by the interface unit 120 includes a dependency input button 211, a flow creation button 212, a program creation button 213, a flow display window 220, a simulation window 240, and a timeline window 230.

The dependency input button 211 is a button for starting dependency setting for each of a plurality of work jobs stored by the job information storage unit 112. The flow creation button 212 is a button for starting the creation of a flowchart determining the execution order of a plurality of work jobs. The program creation button 213 is a button for instructing the creation of the operation program according to the foregoing flowchart.

The flow display window 220 is a window that displays a job image indicating, for each of the plurality of robots 2, a flowchart in which a plurality of jobs are arranged in execution order, and a marker indicating a part, in the flowchart, that is executed at the verification target time. In some examples, the job image may comprise: a first flowchart in which a plurality of symbols corresponding to the jobs of the first program are arranged in execution order; a first marker indicating in the first flowchart the job program executed by the first robot at the verification target time; a second flowchart in which a plurality of symbols corresponding to the jobs of the second program are arranged in execution order; and a second marker indicating in the second flowchart the job program executed by the second robot at the verification target time. Each flowchart includes a plurality of work symbols each indicating a plurality of work jobs, and a plurality of movement symbols each indicating a plurality of transitional jobs. In some examples, a plurality of symbols corresponding to the work jobs and the transitional job of the first program may be arranged in execution order in the first flowchart. The job image may include a first marker indicating in the first flowchart the job program executed by the first robot at the verification target time. A plurality of symbols corresponding to the work jobs and the transitional job of the second program may be arranged in execution order in the second flowchart. The job image may include a second marker indicating in the second flowchart the job program executed by the second robot at the verification target time. For example, each flowchart includes a start point 221, a plurality of work blocks 222 (work symbols) each indicating a plurality of work jobs, a plurality of movement lines 223 (movement symbols) each indicating a plurality of transitional jobs, and an end point 224.

The start point 221 indicates a work job (hereinbelow called "operation start job") in which the tip part 12 is disposed in a predetermined operation start position and a predetermined operation start attitude. The end point 224 indicates a work job (hereinbelow called "operation end job") in which the tip part 12 is disposed in a predetermined operation end position and a predetermined operation end attitude. The operation end position and operation end attitude may also be the same as the operation start position and operation start attitude.

The plurality of work blocks 222 are arranged extending from the start point 221 toward the end point 224 in an arrangement order according to the execution order. The plurality of movement lines 223 include a movement line 223 that connects the start point 221 to an initial work block 222, a movement line 223 that connects together adjacent work blocks 222, and a movement line 223 that connects a final work block 222 to the end point 224. All the movement lines 223 indicate transitional jobs between two work jobs arranged in chronological order.

The marker 225 is illustrated by means of an arrow shape next to the flowchart, for example, and indicates the part of the flowchart that is executed at the verification target time. The part that is executed at the verification target time may also be illustrated by using color, brightness, or thickness to highlight the display of the work block 222 or the movement line 223 executed at the verification target time. In this case, the work block 222 or movement line 223 itself whose display is highlighted functions as a marker.

The simulation window 240 may be configured to display a simulation image of the plurality of robots 2 at the verification target time. The simulation image includes a robot image 241 that illustrates the robots 2 in their positions and attitude at the verification target time and a workpiece image 242 that illustrates workpieces in their positions and attitude at the verification target time. The simulation image may also further include an image illustrating objects neighboring the robots 2 such as jigs or conveyance devices.

The timeline window 230 displays a time designation image for designating the verification target time. The time designation image may extend along a time elapse direction. The time designation image of the timeline window 230 includes an elapsed time bar 231 for each of the plurality of robots 2, a cursor 232, a playback button 233, a stop button 234, and a total time display unit 235.

The elapsed time bar 231 is illustrated so as to follow the direction representing the time axis (the vertical direction in FIG. 3) and indicates the length of time by means of the length along this direction. The elapsed time bar 231 includes a work period display unit 236 indicating a work job execution period, a movement period display unit 237 indicating a transitional job execution period, and a standby period display unit 238 indicating a job execution standby period.

The cursor 232 designates the verification target time by means of the position in the direction representing the time axis. The cursor 232 in FIG. 3 is illustrated in the form of a line crossing all the elapsed time bars 231 but is not limited thereto. The cursor 232 may be displayed such that the position in the direction representing the time axis is illustrated. For example, the cursor 232 may be illustrated in the form of an arrow or a dot next to the elapsed time bar 231.

The playback button 233 may be configured to indicate the movement of the cursor 232 at a predetermined speed. As a result of moving the cursor 232, the marker 225 moves in the flow display window 220, and the robot images 241 and workpiece image 242 are displayed as moving images in the simulation window 240. The stop button 234 may be configured to indicate stoppage of the movement of the cursor 232. The total time display unit 235 indicates the time required to execute the operation program.

In FIG. 3, two flowcharts are illustrated in the flow display window 220, two elapsed time bars 231 are illustrated in the timeline window 230, and two robot images 241 are illustrated in the simulation window 240, but the numbers of these images may be changed according to the number of robots 2. Furthermore, the example layout of the flow display window 220, timeline window 230, and simulation window 240 in FIG. 3 may be modified in arrangement and detail. The flow display window 220 and simulation window 240 may also be displayed in an overlapping manner to enable switching by means of tab selection. The timeline window 230 may also be illustrated so that the time axis is horizontal.

Returning to FIG. 2, the dependency setting unit 113 displays, on the interface unit 120, an image for inputting dependency in response to the dependency input button 211 being pressed, and sets dependency between work jobs in response to inputs to the image. Dependency between work jobs signifies the execution timing relationship with another work job which should be satisfied in order to execute any given work job. The execution timing relationship includes, for example, a prior relationship between work jobs and an interval between the work jobs. For example, the dependency setting unit 113 sets, for each work job, identification information of another work job to be executed beforehand (hereinafter called "required prior job"), and an interval to be provided after the required prior job. There may also be two or more required prior jobs.

In some examples, the dependency setting unit 113 displays, on the interface unit 120, a work job selection image (hereinafter called "target selection image") in response to the dependency input button 211 being pressed. Additionally, the dependency setting unit 113 displays, on the interface unit 120, a dependency input image for a work job (hereinafter called "target job") which is selected via the target selection image. Furthermore, the dependency setting unit 113 sets the dependency relating to the target job in response to an input to the dependency input image. The dependency input image is used to input a required prior job and an interval to be provided after the required prior job, and may be configured to enable two or more required prior jobs to be designated. The dependency storage unit 114 stores dependency between work jobs that are preset by the dependency setting unit 113.

The program generation unit 130 generates, for each of the plurality of robots 2, an operation program that includes a plurality of jobs based on information which the interface unit 120 acquires from the user interface screen 200. The program storage unit 115 stores, for each of the plurality of robots 2, the operation program generated by the program generation unit 130. For example, the program storage unit 115 may be configured to store a first program and a second program. The first program comprises a first set of time series jobs. Each job of the first program defines at least one operation of the first robot. The first program is configured to be performed along a shared time line. The second program comprises a second set of time series jobs. Each job of the second program defines at least one operation of the second robot. The second program is configured to be performed along the shared time line. The first program may include at least two jobs execution periods of which are different from each other. The second program may include at least two jobs execution periods of which are different from each other. At least two of the first set of time series job may include at least one command for the first robot indicating a target position and a target speed. At least two of the second set of time series jobs may include at least one command for the second robot indicating a target position and a target speed.

The program verification assistance unit 140 executes, based on the operation program, the generation of a job image indicating jobs executed by the plurality of robots 2 at the verification target time and the generation of a simulation image of the plurality of robots 2 at the verification target time using the operation simulation based on the operation program.

In some examples, the program verification assistance unit 140 recognizes, based on the operation program stored by the program storage unit 115, jobs executed by the robots 2 at the verification target time and outputs the recognition results to the interface unit 120 to update the job image of the flow display window 220. Furthermore, the program verification assistance unit 140 generates a simulation image of the plurality of robots 2 at the verification target time using the operation simulation based on the operation program stored by the program storage unit 115 and outputs the simulation image to the interface unit 120 to update the simulation image of the simulation window 240.

The simulator 150 executes the operation simulation. The simulator 150 holds model data indicating the arrangement, structure and part dimensions, and the like, of the robots 2 and uses an inverse kinematics operation to calculate the angles of the joints 31, 32, 33, 34, 35, and 36 according to the model data and the target position and target attitude of the tip part 12. Furthermore, based on the angles of the joints 31, 32, 33, 34, 35, and 36, the simulator 150 also determines the existence of collisions and generates the simulation image.

Figure 4:
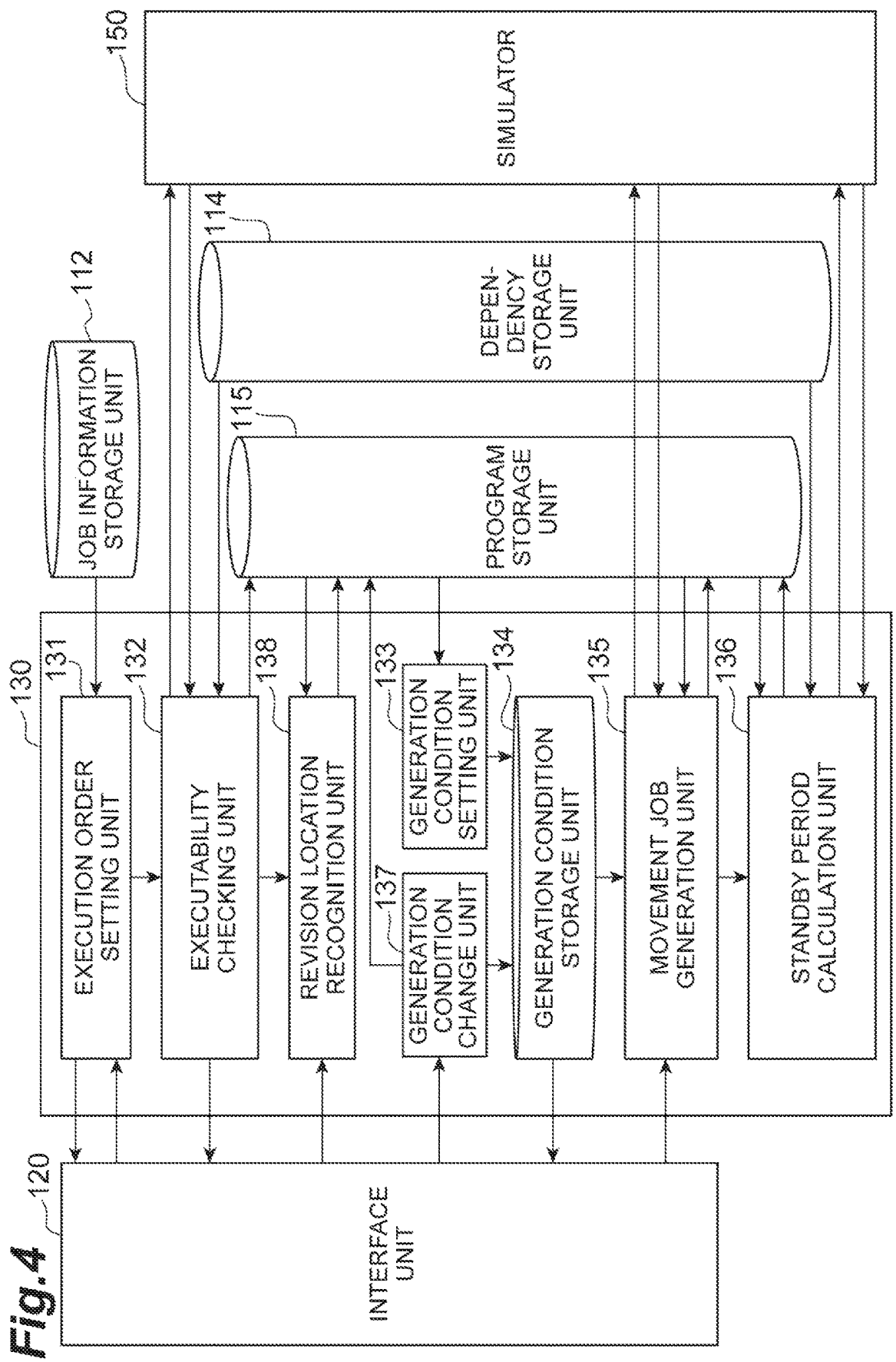
FIG. 4 is a block diagram illustrating an example configuration of a program generation unit.

The configurations of the program generation unit 130, the program verification assistance unit 140, and the simulator 150 are described in further detail hereinbelow. As illustrated in FIG. 4, the program generation unit 130 has, as functional blocks, an execution order setting unit 131, an executability checking unit 132, a generation condition setting unit 133, a generation condition storage unit 134, a transitional job generation unit 135, a standby period calculation unit 136, a generation condition change unit 137, and a revision location recognition unit 138.

The execution order setting unit 131 sets, for each of the plurality of robots 2, the execution order of a plurality of work jobs based on inputs to the user interface screen 200. In some examples, the execution order setting unit 131 may set a first execution order of the work jobs of the first program and a second execution order of the work jobs of the second program based on a user input. For example, the execution order setting unit 131 displays, on the interface unit 120, a work job selection image (hereinafter called an "executed job selection image") in response to the flow creation button 212 being pressed.

The executed job selection image is used for inputting, for each of the robots 2, a plurality of work jobs to be executed (hereinafter called "executed jobs") and the execution order of the plurality of executed jobs. The execution order setting unit 131 sets, for each of the robots 2, the execution order of the plurality of executed jobs in response to inputs to the executed job selection image.

The executability checking unit 132 checks whether the work motions of a robot 2 defined by the work jobs of the operation program satisfy a motion constraint (a sequential operating condition associated with at least two of the work jobs) of the robot 2. The executability checking unit 132 may check whether the execution order of the work jobs satisfies a sequential condition associated with at least two of the work jobs, based on the first program and the second program. In some examples, the executability checking unit 132 determines, for each of the robots 2, the executability of a plurality of executed jobs according to the execution order (hereinafter called the "set order") set by the execution order setting unit 131, based on the motion constraint of each of the robots 2 and a dependency stored by the dependency storage unit 114 (a sequential condition associated with at least two of the work jobs). One or more examples of the motion constraint include a movable range of the tip part 12, a movable angle of the joints 31, 32, 33, 34, 35, and 36, or the like. The movable angle is the maximum operating angle permitted.

In some examples, the executability checking unit 132 causes the simulator 150 to calculate the operating angles of the joints 31, 32, 33, 34, 35, and 36 for moving the tip part 12 according to the executed job and acquires, from the simulator 150, the result of determining whether or not the calculation result lies within the movable angle. If it is determined by the simulator 150 that the operating angle of the joints 31, 32, 33, 34, 35, and 36 exceeds the movable angle, the executability checking unit 132 determines that the execution of the plurality of executed jobs according to the set order is impossible.

Moreover, the executability checking unit 132 may determine that the execution of the plurality of executed jobs according to the set order is impossible in cases where the required prior job for any executed job does not precede the executed job.

If a required prior job for an executed job of a robot 2 is executed by another robot 2, the executed job may satisfy a dependency stored by a time designation unit 142 through adjustment of the operation timing with the other robot 2. Therefore, the executability checking unit 132 may determine that the executed job satisfies dependency if the required prior job for any executed job is an executed job of another robot 2 of the robots 2 executing the executed job.

If it is determined that the execution of the plurality of executed jobs according to the set order is impossible for any of the robots 2, the executability checking unit 132 displays, on the interface unit 120, an error message that contains information indicating which condition of a particular executed job is not satisfied. If, on the other hand, it is determined that the execution of the plurality of executed jobs according to the set order is possible for all the robots 2, the executability checking unit 132 uses the interface unit 120 to display, in the flow display window 220 and according to the set order, a flowchart of each of the plurality of robots 2.

In addition, the executability checking unit 132 saves, in the program storage unit 115 as the operation program, a program obtained by inserting the plurality of executed jobs between the operation start job and the operation end job according to the set order, for each of the plurality of robots 2. Accordingly, an operation program that moves the shortest distance between executed jobs is provisionally generated.

The generation condition setting unit 133 sets, in the provisionally generated operation program, a transitional job generation condition as a preset initial condition, for each of the movement segments between work jobs (executed jobs). One or more examples of the transitional job generation condition include conditions for defining the number of jobs generated as transitional job candidates ("hereinafter called "candidate jobs") and a candidate job selection condition (hereinafter called the "first-type condition").

One or more examples of the selection condition include the highest evaluation points for a movement job characteristic (movement time, movement distance, or power consumption during movement, or the like). The evaluation points may be points based on only one type of characteristic or may be points based on a plurality of types of characteristics.

Other examples of the transitional job generation condition include a condition defining a threshold value for adopting evaluation points of a transitional job characteristic (hereinafter called a "second-type condition"). Furthermore, such conditions also include conditions defining the time or frequency for repeating candidate job generation and defining the candidate job selection condition (hereinafter called "third-type conditions"). Two or more of these types of generation conditions may also be combined.

The generation condition storage unit 134 stores, for each of the movement segments, the generation conditions set by the generation condition setting unit 133.

The transitional job generation unit 135 (the job generation unit) generates, for each of the plurality of robots 2, a transitional job between a plurality of work jobs based on the execution order set by the execution order setting unit 131. In some examples, the transitional job generation unit 135 may generate at least one transitional job which defines a motion of the first robot between two sequential work jobs of the first program based on the first execution order. The transitional job generation unit 135 may generate at least one transitional job which defines a motion of the second robot between two sequential work jobs of the second program based on the second execution order. For example, the transitional job generation unit 135 generates, for each movement segment, a transitional job according to generation conditions stored by the generation condition storage unit 134.

In some examples, the transitional job generation unit 135 generates a transitional job so as to link between the endpoint of a preceding work job (the target position and target attitude of the final operating command) and the starting point of the following work job (the target position and target attitude of the initial operating command) and to avoid collisions of the robots 2 with workpieces and neighboring objects. By way of providing an example, the transitional job generation unit 135 generates a passing point that enables collision avoidance and repeats the revision of the transitional job to achieve passage via the passing point until collision avoidance is possible for the whole transitional job.

When generating a transitional job, the transitional job generation unit 135 causes the simulator 150 to execute a determination of the existence of collisions of the robots 2 with workpieces and neighboring objects. Another method for generating a transitional job is also disclosed in Japanese Patent No. 4103057, for example.

If the generation condition stored by the generation condition storage unit 134 is the first-type condition, the transitional job generation unit 135 generates, using the foregoing generation method, candidate jobs in a quantity defined by the first-type condition, and selects any candidate job as the transitional job according to the selection condition defined by the first-type condition.

If the generation condition stored by the generation condition storage unit 134 is the second-type condition, the transitional job generation unit 135 repeats the generation of the transitional job by using the foregoing generation method until the evaluation points of the transitional job characteristic exceed the adoption threshold value defined by the second-type condition.

If the generation condition stored by the generation condition storage unit 134 is the third-type condition, the transitional job generation unit 135 repeats the generation of candidate jobs until the time or frequency defined by the third-type condition is reached, and selects any candidate job as the transitional job according to the selection condition defined by the third-type condition.

The standby period calculation unit 136 calculates (or sets), for each of the plurality of robots 2, the respective execution standby periods of the plurality of jobs (including the work jobs and transitional jobs) to adjust the relative operation timing of the plurality of robots 2. In some examples, the standby period calculation unit 136 may calculate at least one standby period between two sequential jobs of the first program to adjust the relative operation timing of the first robot and the second robot. The standby period calculation unit 136 may calculate at least one standby period between two sequential jobs of the second program to adjust the relative operation timing of the first robot and the second robot. The time designation image may further include: a first time bar extending along the time elapse direction and including execution portions indicating execution periods of the first program and at least one standby portion indicating the at least one standby period of the first program; and a second time bar extending along the time elapse direction and including execution portions indicating execution periods of the second program and at least one standby portion indicating the at least one standby period of the second program. The execution portions of the first time bar may include work execution portions indicating execution periods of the work jobs of the first program and at least one transitional portion indicating an execution period of the at least one transitional job of the first program. The execution portions of the second time bar may include work execution portions indicating execution periods of the work jobs of the second program and at least one transitional portion indicating an execution period of the at least one transitional job of the second program. For example, if the operation program of another robot 2 includes a required prior job for a work job of any given robot 2, the standby period calculation unit 136 calculates the standby period of this work job so that the work job is started after the required prior job.

In addition, if two robots 2 collide upon executing a job simultaneously, the standby period calculation unit 136 calculates the job standby period of either of the robots 2 so that the jobs are executed sequentially. The standby period calculation unit 136 causes the simulator 150 to execute a determination of the existence of a collision between the robots 2.

The programming assistance device 100 may be configured to revise the operation program based on an operating input to the flow display window 220. For example, the execution order setting unit 131 may change the execution order of at least one robot 2 (hereinafter called the "revision target robot") pertaining to the movement of the work job in response to an input that moves the work job (for example, a dragging input that moves the work block 222) within the job image of the flow display window 220. If an input is made to move a work job between two flowcharts within the job image of the flow display window 220, there are two revision target robots. In some examples, the execution order setting unit 131 may change the first execution order according to a user request to move a target job of the work jobs of the first program in the first flowchart. The execution order setting unit may change the first execution order and the second execution order according to a user request to move a target job of the work jobs between the first flowchart and the second flowchart.

The executability checking unit 132 redetermines the executability of the plurality of executed jobs according to the changed execution order (hereinafter called the "changed order") for the revision target robots. Upon determining that the execution of the plurality of executed jobs according to the changed order is impossible, the executability checking unit 132 causes the interface unit 120 to display an error message that contains information indicating which condition of a particular executed job is not satisfied.

On the other hand, upon determining that the execution of the plurality of executed jobs according to the changed order is possible, the executability checking unit 132 uses the interface unit 120 to revise, according to the changed order, the flowcharts of the revision target robots in the flow display window 220.

In addition, a program obtained by inserting the plurality of executed jobs between the operation start job and the operation end job according to the changed order is saved in the program storage unit 115 as the operation program of the revision target robots. Accordingly, a post-revision operation program (hereinafter called the "post-revision program") of the revision target robots is provisionally generated.

The generation condition setting unit 133 changes, in the provisionally generated post-revision program, a transitional job generation condition as a preset initial condition, for each of the movement segments between work jobs, and saves the transitional job generation condition in the generation condition storage unit 134.

The transitional job generation unit 135 regenerates at least one transitional job based on the execution order changed by the execution order setting unit 131. For example, the transitional job generation unit 135 regenerates, for each movement segment of the revised program, a transitional job according to generation conditions stored by the generation condition storage unit 134. In some examples, the transitional job generation unit 135 may regenerate at least one transitional job according to the first execution order changed according to the user request. The transitional job generation unit 135 may regenerate at least one transitional job according to the second execution order changed according to the user request.

The standby period calculation unit 136 changes, for each of the plurality of robots 2, the respective execution standby periods of the plurality of jobs based on the execution order recalculated (or changed) by the execution order setting unit 131 and the transitional job regenerated by the transitional job generation unit 135. In some examples, the standby period calculation unit 136 may recalculate the standby periods of the first program and the second program according to the changed first execution order.

The program generation unit 130 may also further include the revision location recognition unit 138. The revision location recognition unit 138 recognizes a revision necessary location in which transitional job regeneration according to the change of the execution order by the execution order setting unit 131 is required and a revision unnecessary location in which transitional job regeneration is not required. In this case, the transitional job generation unit 135 regenerates a transitional job of the revision necessary location without regenerating the transitional job of the revision unnecessary location. In some examples, the transitional job generation unit 135 may skip regeneration of a transitional job which is not associated with the work job moved by the user. In some examples, the revision location recognition unit 138 may identify one or more pairs of sequential work jobs which include a transitional job of the at least one transitional job therebetween, according to the first execution order. The revision location recognition unit 138 may identify a pair of sequential work jobs in the one or more pairs of sequential work jobs, which does not include the target job therebetween, according to the first execution order changed according to the user request. In this case, the transitional job generation unit 135 may retain the transitional job between the pair of sequential work jobs which does not include the target job therebetween in the first execution order changed according to the user request.

In some examples, the revision location recognition unit 138 confirms whether or not the same movement segment exists in the pre-revision operation program (hereinafter called the "pre-revision program") for each of the movement segments of the post-revision program. The same movement segment signifies a movement segment for which there is coincidence between the preceding and subsequent work jobs. If a movement segment which is the same as the movement segment of the post-revision program does not exist in the pre-revision program, the revision location recognition unit 138 recognizes this movement segment as a revision necessary location.

If a movement segment which is the same as the movement segment of the post-revision program exists in the pre-revision program, the revision location recognition unit 138 recognizes this movement segment as a revision unnecessary location and inserts the same transitional job as in the pre-revision program into the movement segment. The transitional job generation unit 135 does not regenerate, in the post-revision program, the transitional job of the movement segment into which the transitional job has been inserted and regenerates a transitional job of a movement segment into which a transitional job has not been inserted.

The program generation unit 130 may further include the generation condition change unit 137. The generation condition change unit 137 individually changes the generation conditions of transitional jobs in response to inputs to a job image in the flow display window 220. In some examples, the generation condition change unit may select a transitional job pointed by a user in the job image; and change a generation condition for the selected transitional job according to an input by the user. For example, the generation condition change unit 137 causes the interface unit 120 to display a generation condition input image for a transitional job in response to an input (for example, clicking of the movement line 223) to select the transitional job in the job image in the flow display window 220 and changes the generation condition of the transitional job based on the input to the input image.

In some examples, the generation condition change unit 137 sets the generation condition of the transitional job based on the input to the input image and overwrites the generation condition storage unit 134. In this case, the transitional job generation unit 135 regenerates, based on the generation condition changed by the generation condition change unit 137, a transitional job that corresponds to the changed generation condition.

In some examples, if the transitional job generation condition has been changed, the generation condition change unit 137 erases the transitional job from the program storage unit 115. The transitional job generation unit 135 regenerates the transitional job of the movement segment from which the transitional job has been erased.

Figure 5:
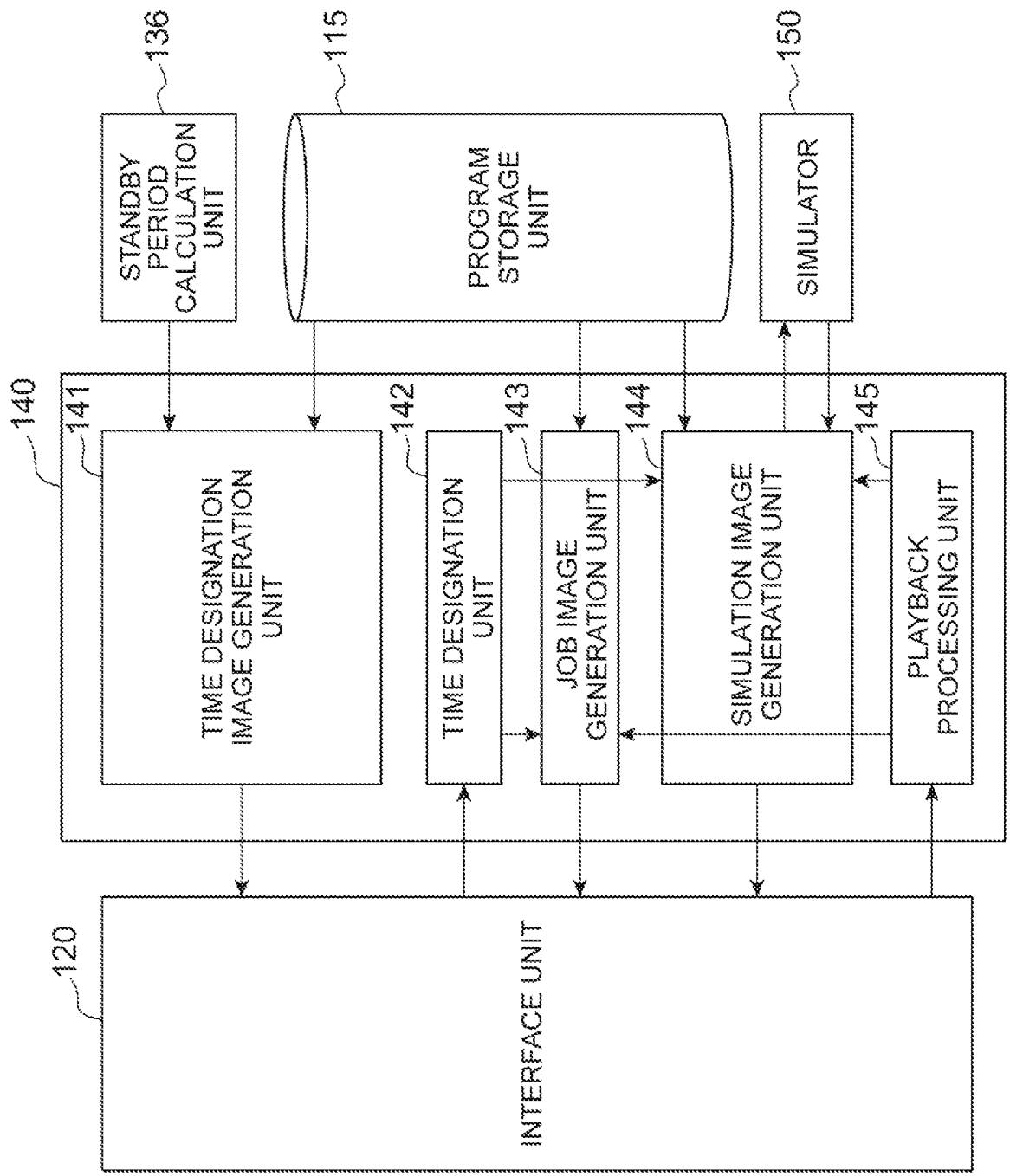
FIG. 5 is a block diagram illustrating an example configuration of a program verification assistance unit.

As illustrated in FIG. 5, the program verification assistance unit 140 includes, as functional blocks, a time designation image generation unit 141, a time designation unit 142, a job image generation unit 143, a simulation image generation unit 144, and a playback processing unit 145.

The time designation image generation unit 141 generates a time designation image that includes a cursor indicating the position in a direction representing the time axis. The time designation image generation unit 141 may also generate a time designation image that further includes, for each of the plurality of robots 2, an elapsed time bar indicating, along the time axis, a job execution period and a job execution standby period. The time designation image generation unit 141 may change position of the time cursor in the time elapse direction based on an user input to the time designation image. The time designation image generation unit 141 may also generate a time designation image to further indicate, on the elapsed time bar, an execution period of the work job and an execution period of the transitional job.

In some examples, the time designation image generation unit 141 generates the data of the time designation image in the timeline window 230 described above and causes the interface unit 120 to display, in the timeline window 230, the time designation image according to the data. A graphical user interface that includes the time designation image is thus constituted.

The time designation image generation unit 141 may also be configured to update the elapsed time bar 231 based on the execution order changed by the execution order setting unit 131, the transitional job regenerated by the transitional job generation unit 135, and the execution standby period changed by the standby period calculation unit 136. In some examples, time designation image generation unit 141 may update the first time bar and the second time bar based on the changed first execution order, the regenerated transitional job, and the recalculated standby periods.

In some examples, the time designation image generation unit 141 generates update data of the elapsed time bar 231 based on the execution order changed by the execution order setting unit 131, the transitional job regenerated by the transitional job generation unit 135 and the execution standby period changed by the standby period calculation unit 136, and causes the interface unit 120 to update the elapsed time bar 231 according to the update data.

The time designation unit 142 designates the verification target time according to the position of the cursor on the time designation image. For example, the time designation unit 142 designates the verification target time based on the position of the cursor 232 on the time designation image in the timeline window 230 (for example, the position of the cursor 232 in the direction of extension of the elapsed time bar 231).

When a verification target time is designated by the user, the job image generation unit 143 generates, based on the operation program, a job image that indicates jobs executed by the plurality of robots 2 at the verification target time. In some examples, the job image generation unit 143 may generate the job image indicating at least one of the first set of time series jobs executed by the first robot and at least one of the second set of time series jobs executed by the second robot at the verification target time, based on the first program and the second program. In some examples, the job image generation unit 143 may calculate an execution period of at least two of the first set of time series jobs based on the command for the first robot, and calculate an execution period of at least two of the second set of time series jobs based on the command for the second robot. The job image generation unit 143 may detect the job executed by the first robot at the verification target time based on the execution period of the at least two of the first set of time series job; and detect the job executed by the second robot at the verification target time based on the execution period of the at least two of the second set of time series jobs. The job image generation unit 143 may also generate a job image so as to indicate, for each of the plurality of robots 2, a flowchart in which a plurality of jobs are arranged in execution order, and a marker indicating a part, in the flowchart, that is executed at the verification target time. In some examples, the job image may comprise a first flowchart in which a plurality of symbols corresponding to the jobs of the first program are arranged in execution order; a first marker indicating in the first flowchart the job program executed by the first robot at the verification target time; a second flowchart in which a plurality of symbols corresponding to the jobs of the second program are arranged in execution order; and a second marker indicating in the second flowchart the job program executed by the second robot at the verification target time. The job image generation unit 143 may also generate a job image that indicates, for each of the plurality of robots 2, a flowchart that includes a plurality of work symbols each indicating a plurality of work jobs, and a movement symbol indicating a transitional job.

In some examples, if a verification target time is designated based on the position of the cursor 232 on the time designation image in the timeline window 230, the job image generation unit 143 recognizes, based on the operation program stored by the program storage unit 115, a job executed by a plurality of robots 2 at the verification target time, and uses the interface unit 120 to display, in the flow display window 220, a marker 225 indicating the recognized job. A graphical user interface that includes the job image is thus constituted.

The simulation image generation unit 144 generates a simulation image of the plurality of robots 2 at the verification target time by using the operation simulation based on the operation program. For example, the simulation image generation unit 144 causes the simulator 150 to generate a simulation image of the plurality of robots 2 at the verification target time.

In some examples, the simulation image generation unit 144 outputs, to the simulator 150, a target position and a target attitude of the tip part 12 of each robot 2 at the verification target time, and causes the simulator 150 to generate a simulation image of the plurality of robots 2, workpieces and neighboring objects. The simulation image generation unit 144 acquires the data of the simulation image generated by the simulator 150 (three-dimensional surface data using polygons, for example) and causes the interface unit 120 to display, in the simulation window 240, the simulation image according to the data. A graphical user interface that includes the simulation image is thus constituted.

The playback processing unit 145 causes the cursor 232 to move at a predetermined speed. For example, the playback processing unit 145 starts the movement of the cursor 232 in response to the playback button 233 being pressed on the user interface screen 200 and stops the movement of the cursor 232 in response to the stop button 234 being pressed.

When the playback processing unit 145 causes the cursor 232 to move, the job image generation unit 143 accordingly updates the marker 225 in the flow display window 220, and the simulation image generation unit 144 updates the robot images 241 and the workpiece image 242, or the like, in the simulation window 240. Accordingly, the marker 225 moves in the flow display window 220 according to the movement of the cursor 232, and the robot images 241 and workpiece image 242, or the like, are displayed as moving images in the simulation window 240.

Figure 6:
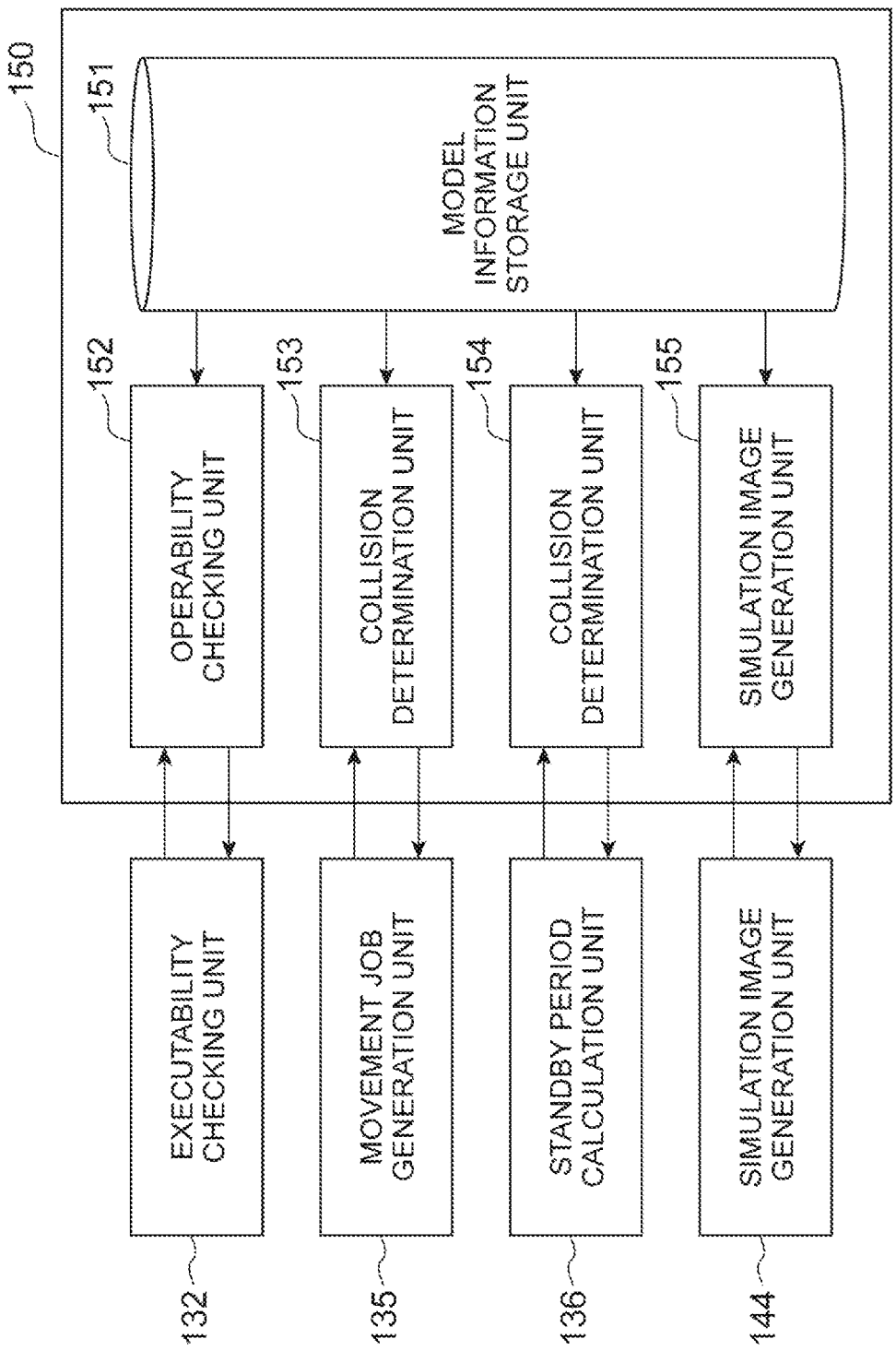
FIG. 6 is a block diagram illustrating an example configuration of a simulator.

As illustrated in FIG. 6, the simulator 150 has a model information storage unit 151, an operability determination unit 152, collision determination units 153, 154 and a simulation image generation unit 155.

The model information storage unit 151 stores model data of the plurality of robots 2, model data of the environment where the plurality of robots 2 are installed, and workpiece model data. The model data of the robots 2 include the layout, structure, and parts dimensions of the robots 2, and movable angles of the joints 31, 32, 33, 34, 35, and 36. The model data of the environment where the plurality of robots 2 are installed includes the layout, structure, and parts dimensions, and the like, of neighboring objects. The workpiece model data also includes the layout, structure, and parts dimensions, and the like.

The operability checking unit 152 acquires the work jobs (the executed jobs) from the executability checking unit 132, and calculates the operating angles of the joints 31, 32, 33, 34, 35, and 36 of each of the robots 2 by means of an inverse kinematics operation based on the target position and target attitude of the tip part 12 and the model data stored by the model information storage unit 151. The operability checking unit 152 determines whether or not the calculated operating angles of the joints 31, 32, 33, 34, 35, and 36 lie within the movable angle and outputs the determination result to the executability checking unit 132.

The collision determination unit 153 acquires the transitional job from the transitional job generation unit 135 and calculates the operating angles of the joints 31, 32, 33, 34, 35, and 36 by means of an inverse kinematics operation based on the target position and target attitude of the tip part 12 and the model data stored by the model information storage unit 151. The collision determination unit 153 calculates the positions of the parts of the robots 2 by means of a direct kinematics operation based on the calculated operating angles of the joints 31, 32, 33, 34, 35, and 36 and the model data stored by the model information storage unit 151 and determines the existence of collisions between the robots 2 and the workpieces and neighboring objects based on the calculation results. The collision determination unit 153 outputs the determination result to the transitional job generation unit 135.

The collision determination unit 154 acquires a transitional job or a work job of each of the robots 2 from the standby period calculation unit 136, and calculates, for each of the robots 2, the operating angles of the joints 31, 32, 33, 34, 35, and 36 by means of an inverse kinematics operation based on the target position and target attitude of the tip part 12 and the model data stored by the model information storage unit 151. The collision determination unit 154 calculates the positions of the parts of the robots 2 by means of a direct kinematics operation based on the calculated operating angles of the joints 31, 32, 33, 34, 35, and 36 and the model data stored by the model information storage unit 151 and determines the existence of collisions between the robots 2 based on the calculation results. The collision determination unit 154 outputs the determination result to the standby period calculation unit 136.

The simulation image generation unit 155 acquires a transitional job or a work job of each of the robots 2 from the simulation image generation unit 144, and calculates, for each of the robots 2, the operating angles of the joints 31, 32, 33, 34, 35, and 36 by means of an inverse kinematics operation based on the target position and target attitude of the tip part 12 and the model data stored by the model information storage unit 151. The simulation image generation unit 155 calculates the positions of parts of the robots 2 by means of a direct kinematics operation based on the calculated operating angles of the joints 31, 32, 33, 34, 35, and 36 and the model data stored by the model information storage unit 151 and generates the data of the simulation image based on the calculation results for each robot 2. The simulation image generation unit 155 outputs the generated data to the simulation image generation unit 144.

Figure 7:
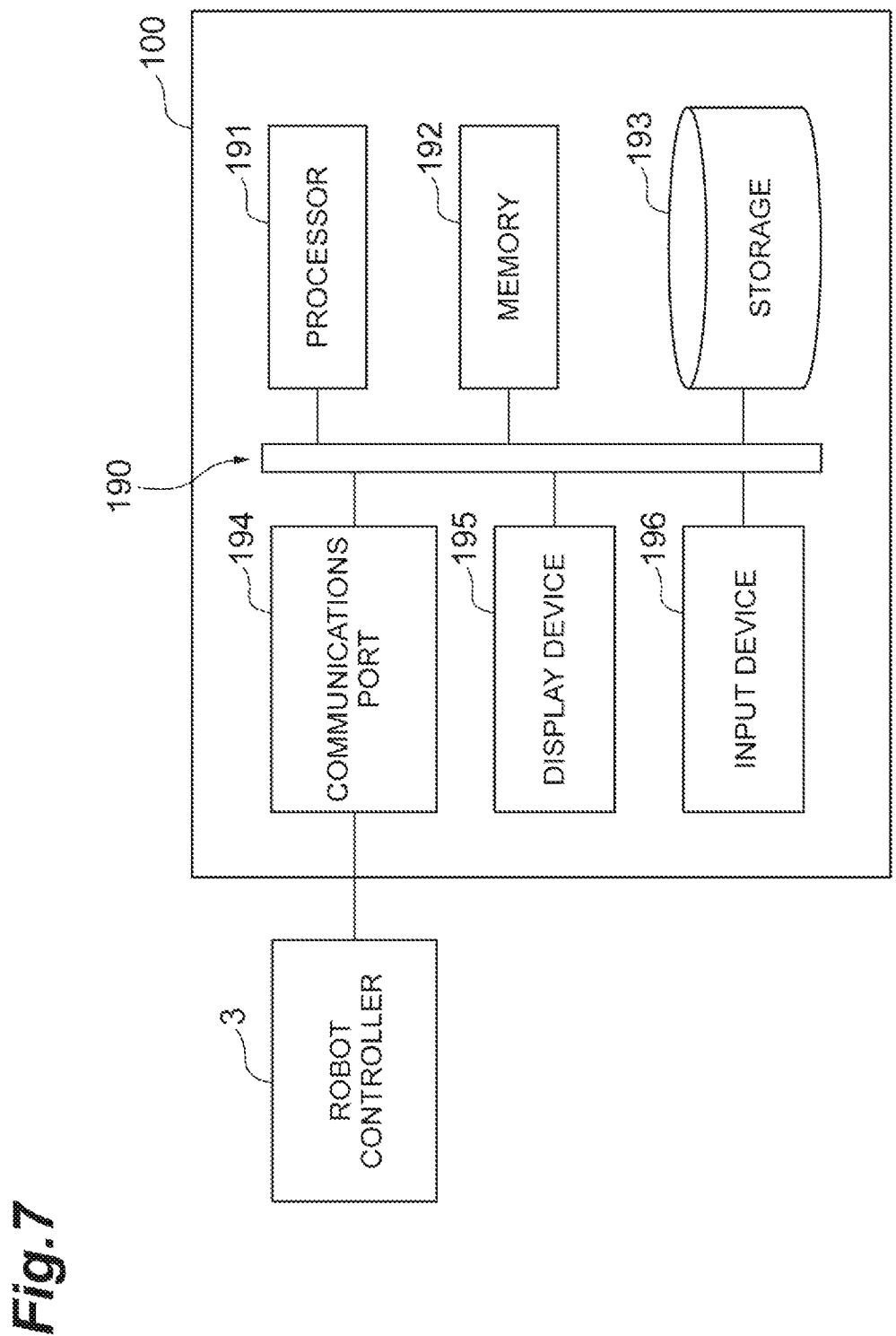
FIG. 7 is a block diagram illustrating an example hardware configuration of a programming assistance device.

FIG. 7 is a block diagram illustrating a hardware configuration of the programming assistance device 100. As illustrated in FIG. 7, the programming assistance device 100 comprises a circuit 190. The circuit 190 has one or a plurality of processors 191, a memory 192, storage 193, a communications port 194, a display device 195, and an input device 196.

The storage 193 stores a program for causing the programming assistance device 100 to execute, for each of a plurality of robots 2, the storage of an operation program that includes each of a plurality of jobs and, if a verification target time is designated by a user, to execute, based on the operation program, the generation of a job image indicating jobs executed by the plurality of robots 2 at the verification target time. For example, the storage 193 is a storage medium such as at least one hard disk or nonvolatile memory and stores a program for configuring functional blocks of the programming assistance device 100 described above.

The memory 192 temporarily stores the program loaded from the storage 193 and the results of operations executed or performed by the processor 191, and the like. The processor 191 executes the program in collaboration with the memory 192. The communications port 194 is configured to communicate with the communications port 194 of another programming assistance device 100 via a wired or wireless communication path according to an instruction from the processor 191.

The display device 195 includes a liquid crystal monitor or the like. The display device 195 is used to display the user interface screen 200, as the interface unit 120 described above. The input device 196 is a keyboard or the like. The input device 196 is used to acquire inputs to the user interface screen 200, as the interface unit 120 described above. The display device 195 and input device 196 may also be integrated as a so-called touch panel.

Programming Assistance Method

Next, by way of providing an example programming assistance method, programming assistance procedures which are executed by the programming assistance device 100 will be described. The example procedures include storing, for each of a plurality of robots 2, an operation program that includes each of a plurality of jobs and, if a verification target time is designated by a user, generating, based on the operation program, a job image indicating jobs executed by the plurality of robots 2 at the verification target time. The example procedures may further include one or more of a dependency registration procedure, an execution order setting procedure, an operation program generation procedure, an execution order changing procedure, a generation condition changing procedure, a time designation image display procedure, a job image display procedure, an operation playback procedure, or any combination thereof. The example procedures are described in further detail hereinbelow.

(Dependency Registration Procedure)

Figure 8:
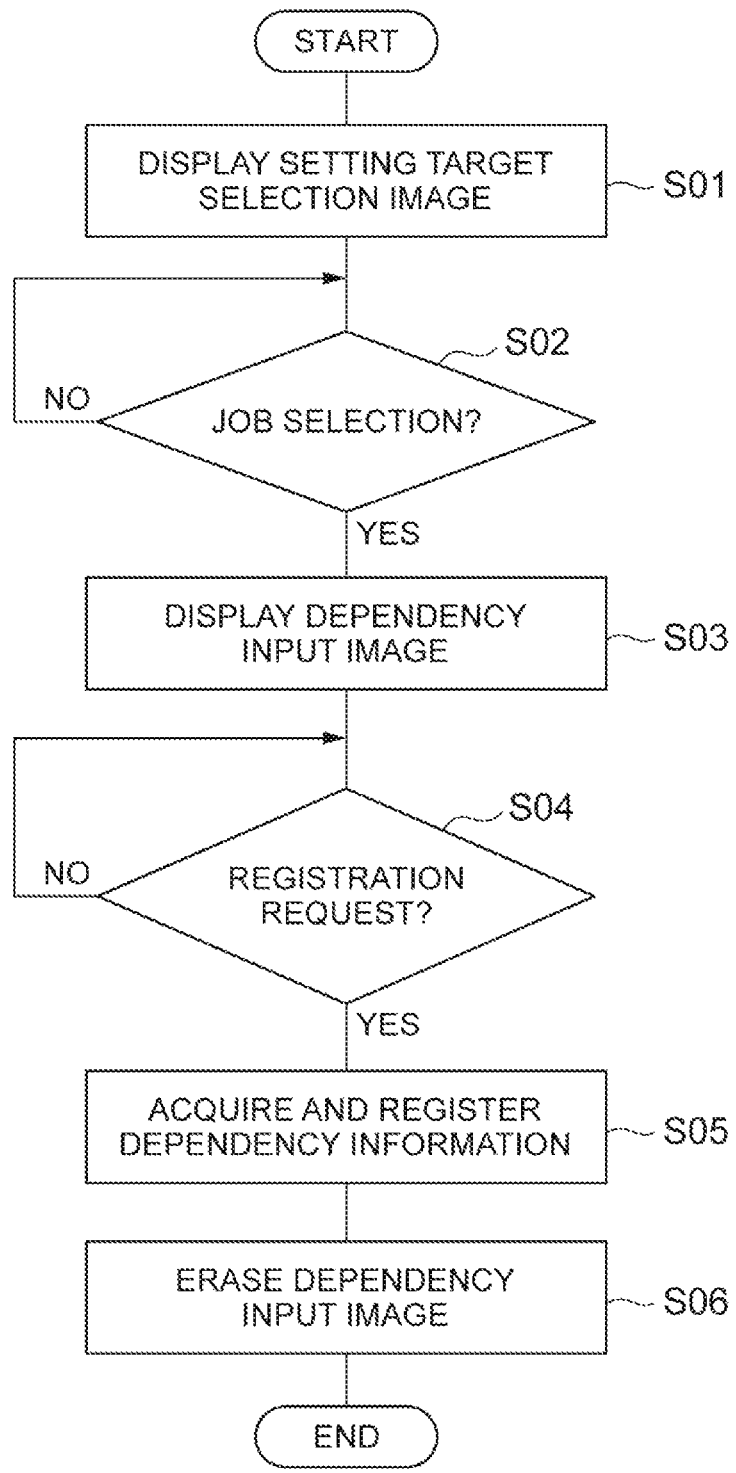
FIG. 8 is a flowchart illustrating an example dependency registration procedure.

FIG. 8 illustrates an example procedure executed by the programming assistance device 100 if the dependency input button 211 of the user interface screen 200 is pressed. As illustrated in FIG. 8, the programming assistance device 100 executes steps S01, S02, S03, S04, S05, and S06. In step S01, the dependency setting unit 113 causes the interface unit 120 to display a work job selection image (the foregoing target selection image). In step S02, the dependency setting unit 113 awaits the selection of a work job via the target selection image.

In step S03, the dependency setting unit 113 causes the interface unit 120 to display a dependency input image for the work job selected via the target selection image. In step S04, the dependency setting unit 113 awaits the issuance of a dependency registration request (waits for the registration button to be pressed, for example) via the dependency input image. In step S05, the dependency setting unit 113 acquires the dependency that has been input to the dependency input image and saves the dependency in the dependency storage unit 114. In step S06, the dependency setting unit 113 causes the interface unit 120 to erase the dependency input image. The dependency registration procedure is completed as outlined hereinabove.

(Execution Order Configuration Procedure)

Figure 9:
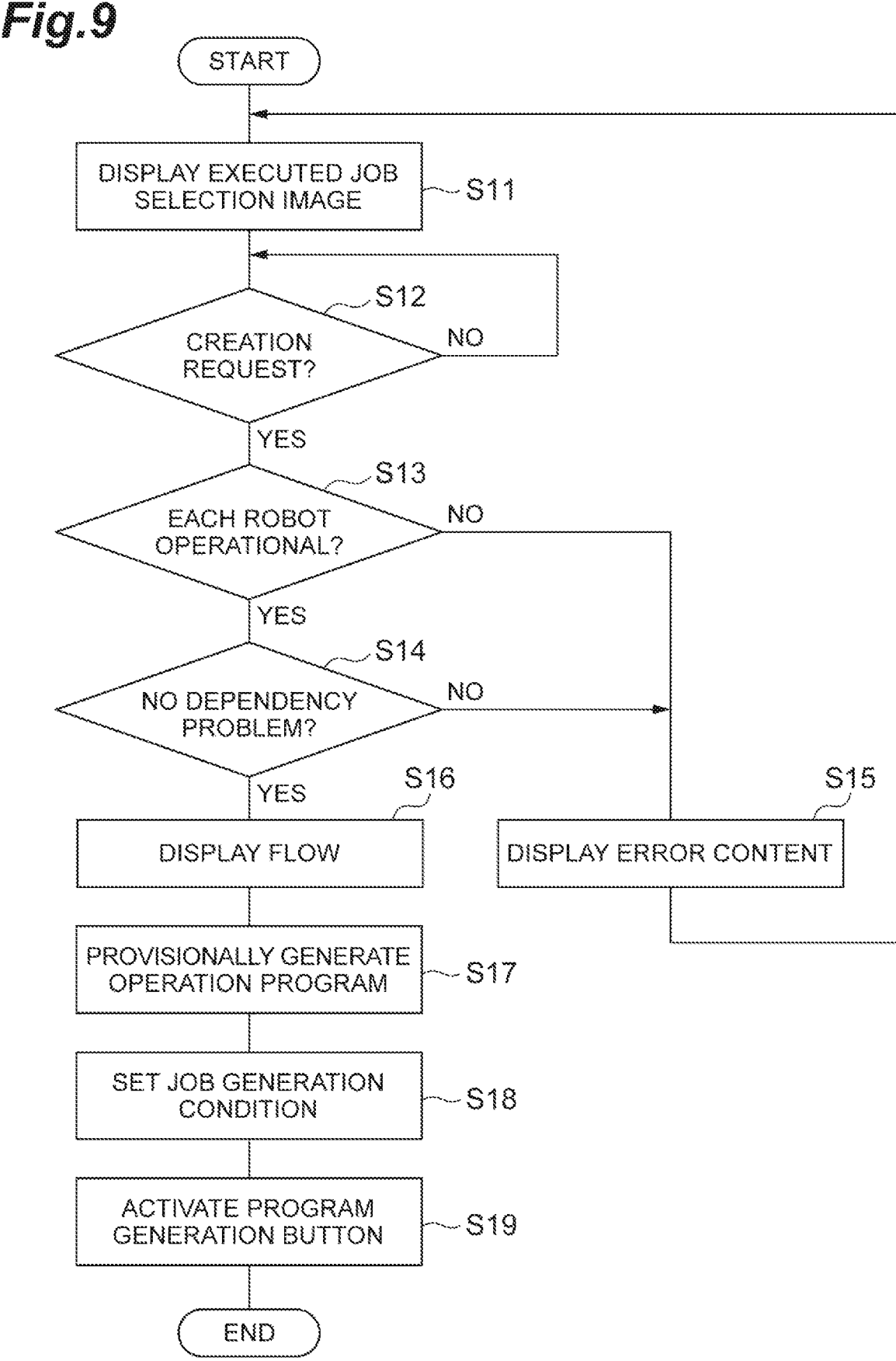
FIG. 9 is a flowchart illustrating an example execution order setting procedure.

FIG. 9 illustrates an example procedure executed by the programming assistance device 100 if the flow creation button 212 of the user interface screen 200 is pressed. As illustrated in FIG. 9, the programming assistance device 100 first executes steps S11, S12, and S13. In step S11, the execution order setting unit 131 causes the interface unit 120 to display the work job selection image (the foregoing executed job selection image). In step S12, the execution order setting unit 131 awaits the issuance of a flowchart creation request (waits for the execution button to be pressed, for example) via the executed job selection image.

In step S13, the executability checking unit 132 determines, for each of the robots 2, whether execution of a plurality of executed jobs is possible according to the execution order (the set order) set by the execution order setting unit 131, based on motion constraint of each of the plurality of robots 2. For example, the executability checking unit 132 causes the simulator 150 to calculate the operating angles of the joints 31, 32, 33, 34, 35, and 36 for moving the tip part 12 according to the executed job and acquires, from the simulator 150, the result of determining whether or not the calculation result lies within the movable angle.

If it is determined in step S13 that the calculation result lies within the movable angle, the programming assistance device 100 executes step S14. In step S14, the executability checking unit 132 confirms whether there is an executed job not satisfying the dependency.

If it is determined in step S13 that the calculation result does not lie within the movable angle or if it is determined in step S14 that there is an executed job not satisfying dependency, the programming assistance device 100 executes step S15. In step S15, the executability checking unit 132 causes the interface unit 120 to display an error message containing information indicating which of the conditions in a particular executed job are not satisfied. Thereafter, the programming assistance device 100 returns the processing to step S11. Accordingly, the selection of a work job is requested once again.

If it is determined in step S14 that there is no executed job not satisfying dependency, the programming assistance device executes steps S16, S17, S18, and S19. In step S16, the executability checking unit 132 uses the interface unit 120 to display, in the flow display window 220 and according to the set order, a flowchart for each of the plurality of robots 2. In step S17, the executability checking unit 132 provisionally generates, as an operation program, a program obtained by inserting the plurality of executed jobs between the operation start job and the operation end job according to the set order, for each of the plurality of robots 2, and saves the provisionally generated operation program in the program storage unit 115.

In step S18, the generation condition setting unit 133 sets, in the provisionally generated operation program, a transitional job generation condition as a preset initial condition, for each of the movement segments between work jobs. In step S19, the interface unit 120 activates the program creation button 213. In some examples, activation signifies an enabling operation by a user. The execution order setting procedure is completed as outlined hereinabove.

(Operation Program Generation Procedure)

Figure 10:
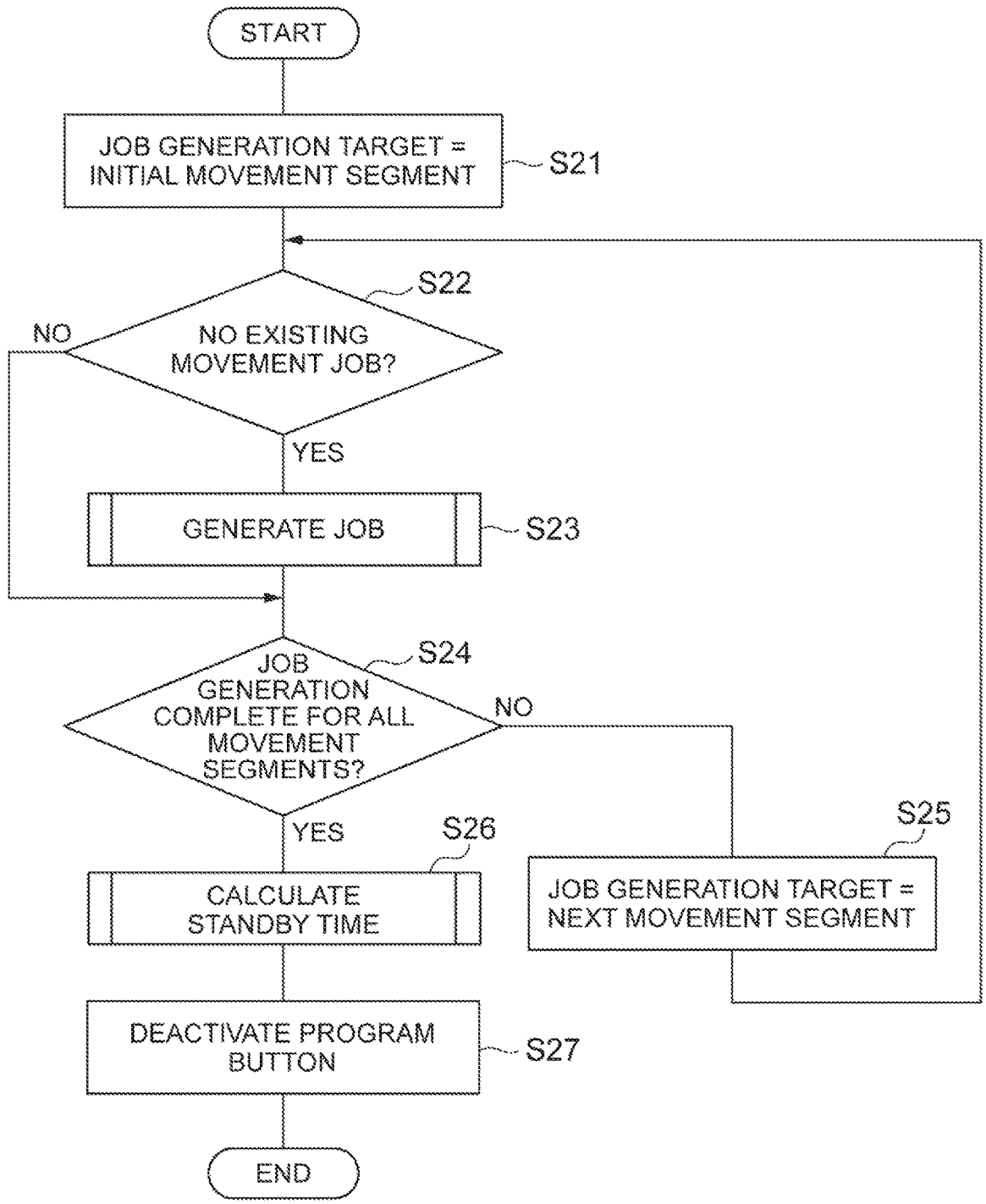
FIG. 10 is a flowchart illustrating an example program generation procedure.

FIG. 10 illustrates an example procedure executed for each of the robots 2 by the programming assistance device 100 if the activated program creation button 213 is pressed. As illustrated in FIG. 10, the programming assistance device 100 first executes steps S21 and S22. In step S21, the transitional job generation unit 135 sets, for an initial movement segment of the operation program in the program storage unit 115, a transitional job generation target. A movement segment of a transitional job generation target is called a "target segment" hereinbelow. In step S22, the transitional job generation unit 135 confirms whether or not there is an existing transitional job in the target segment.

If it is determined in step S22 that there is no existing transitional job in the target segment, the programming assistance device 100 executes step S23. In step S23, the transitional job generation unit 135 generates a transitional job of the target segment according to the generation condition stored by the generation condition storage unit 134. The operations associated with step S23 will subsequently be described in further detail.

The programming assistance device 100 then executes step S24. If it is determined in step S22 that there is an existing transitional job in the target segment, the programming assistance device 100 executes step S24 without executing step S23. In step S24, the transitional job generation unit 135 confirms whether or not a transitional job exists in all the movement segments.

If it is determined in step S24 that there is a movement segment without a transitional job, the programming assistance device 100 executes step S25. In step S25, the transitional job generation unit 135 changes the target segment to the next movement segment. Thereafter, the programming assistance device 100 returns the processing to step S22. Subsequently, until it is determined that a transitional job exists in all the movement segments, the programming assistance device 100 generates and repeats the insertion of a transitional job into a movement segment in which a transitional job has not been inserted.

If it is determined in S24 that a transitional job exists in all the movement segments, the programming assistance device 100 executes steps S26 and S27. In step S26, the standby period calculation unit 136 calculates, for each of the plurality of robots 2, the respective execution standby periods of the plurality of jobs (including the work jobs and transitional jobs) to adjust the relative operation timing of the plurality of robots 2. The operations associated with step S26 will subsequently be described in additional detail. In step S27, the interface unit 120 deactivates the program creation button 213. In some examples, deactivation signifies a prohibiting operation by a user. The operation program generation procedure is completed as outlined hereinabove.

Figure 11:
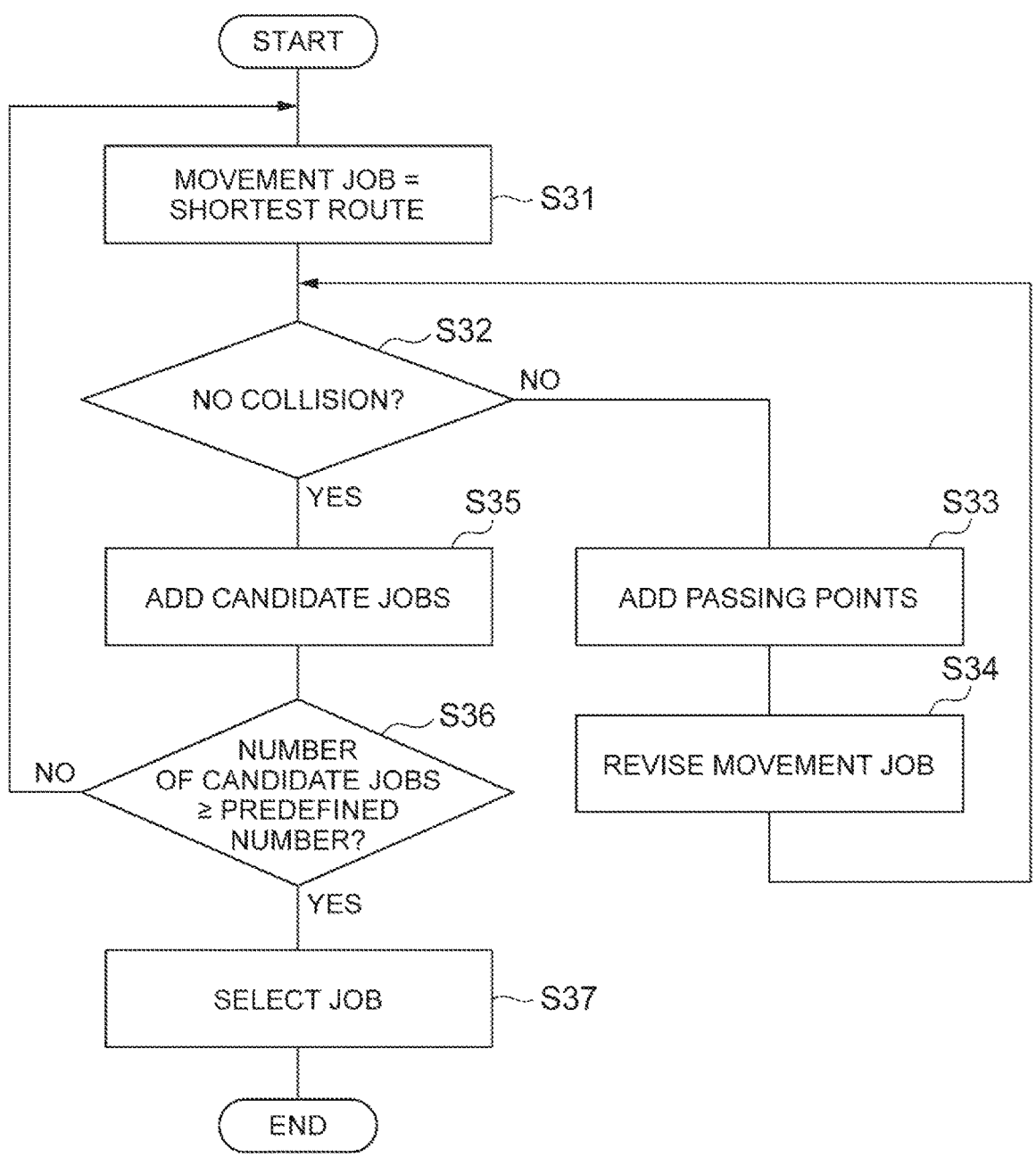
FIG. 11 is a flowchart illustrating an example transitional job generation procedure.

FIG. 11 is a flowchart illustrating the transitional job generation procedure in step S23. FIG. 11 illustrates an example transitional job generation procedure based on the foregoing first-type generation condition. As illustrated in FIG. 11, the programming assistance device 100 first executes steps S31 and S32. In step S31, the transitional job generation unit 135 provisionally generates a transitional job to create the shortest route between the work jobs. In step S32, the transitional job generation unit 135 confirms whether or not there is a collision, for the whole transitional job, between the robots 2 and the workpieces and neighboring objects.

If it is determined in step S32 that there is a collision between the robots 2 and the workpieces and neighboring objects, the programming assistance device 100 executes steps S33 and S34. In step S33, the transitional job generation unit 135 generates passing points enabling collision avoidance. In step S34, the transitional job generation unit 135 revises the transitional job for passage through the generated passing points. Thereafter, the programming assistance device 100 returns the processing to step S32. Subsequently, until it is determined that there is no collision, for the whole transitional job, between the robots 2 and the workpieces and neighboring objects, the addition of passing points and transitional job revision are repeated.

If it is determined in step S32 that there is no collision, for the whole transitional job, between the robots 2 and the workpieces and neighboring objects, the programming assistance device 100 executes step S35. In step S35, the transitional job generation unit 135 takes the transitional jobs generated thus far as candidate jobs. In step S36, the transitional job generation unit 135 confirms whether or not the number of candidate jobs has reached the number (hereinafter called the "predefined number") defined by the first-type condition.

If it is determined in step S36 that the number of candidate jobs has not reached the predefined number, the programming assistance device 100 returns the processing to step S31. Subsequently, until the number of candidate jobs reaches the predefined number, the generation of candidate jobs is repeated. If it is determined in step S36 that the number of candidate jobs has reached the predefined number, the programming assistance device 100 executes step S37. In step S37, the transitional job generation unit 135 selects any candidate job as a transitional job according to the selection condition defined by the first-type condition. The transitional job generation procedure is completed as outlined hereinabove.

Figure 12:
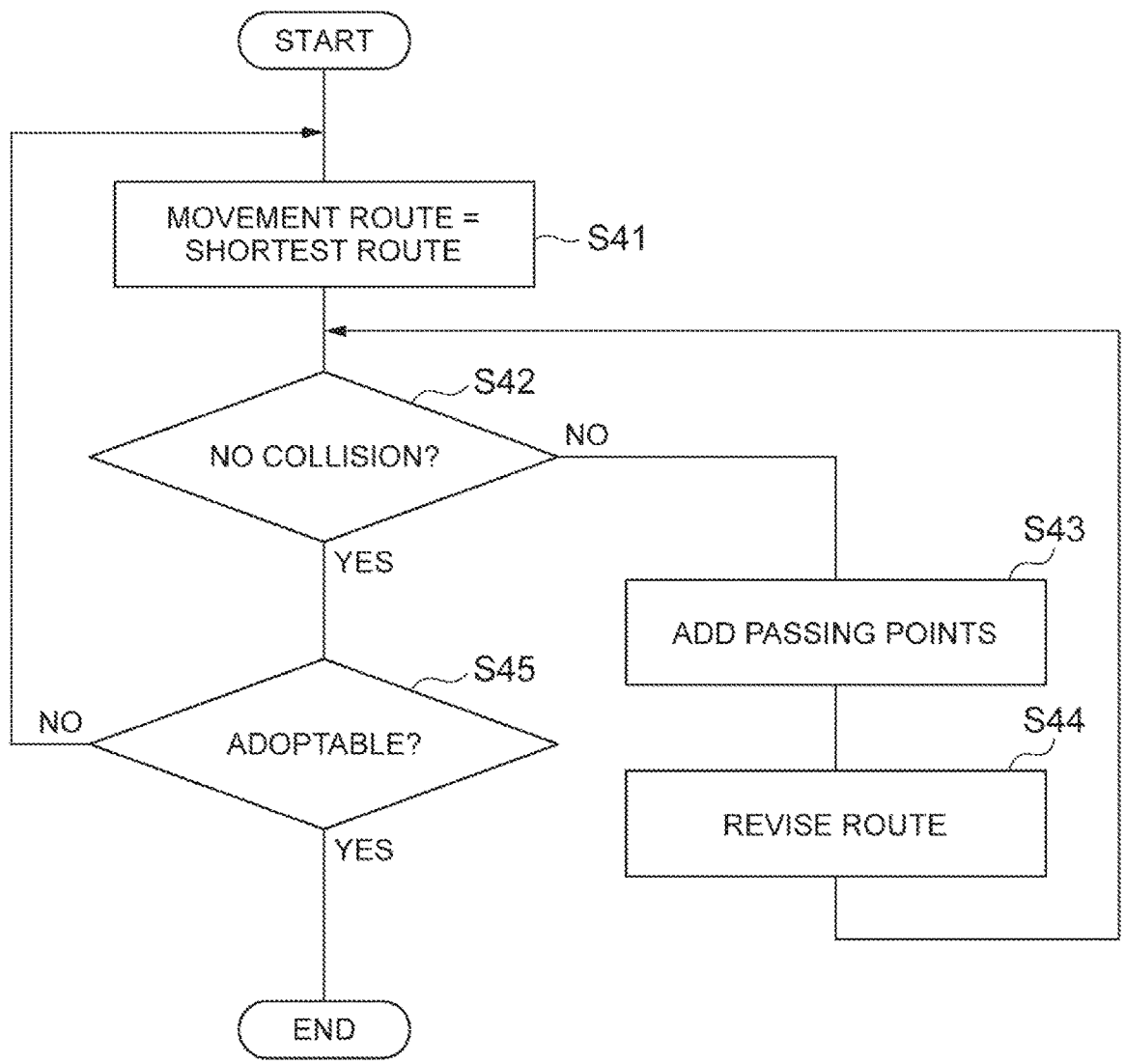
FIG. 12 is a flowchart illustrating another example transitional job generation procedure.

FIG. 12 illustrates an example transitional job generation procedure based on the foregoing second-type generation condition. As illustrated in FIG. 12, until it is determined that there is no collision, for the whole transitional job, between the robots 2 and the workpieces and neighboring objects, the programming assistance device 100 first repeats steps S41, S42, S43, and S44 which are like steps S31, S32, S33, and S34.

If it is determined in step S42 that there is no collision, for the whole transitional job, between the robots 2 and the workpieces and neighboring objects, the programming assistance device 100 executes step S45. In step S45, the transitional job generation unit 135 confirms whether or not the characteristic of the transitional job has exceeded the adoption threshold value defined by the second-type condition.

If it is determined in step S45 that the characteristic of the transitional job has not exceeded the adoption threshold value defined by the second-type condition, the programming assistance device 100 returns the processing to step S41. Subsequently, until a transitional job exceeding the adoption threshold value is generated, the generation of transitional jobs is repeated. If it is determined in step S45 that the characteristic of the transitional job has exceeded the adoption threshold value defined by the second-type condition, the transitional job generation procedure is complete.

Figure 13:
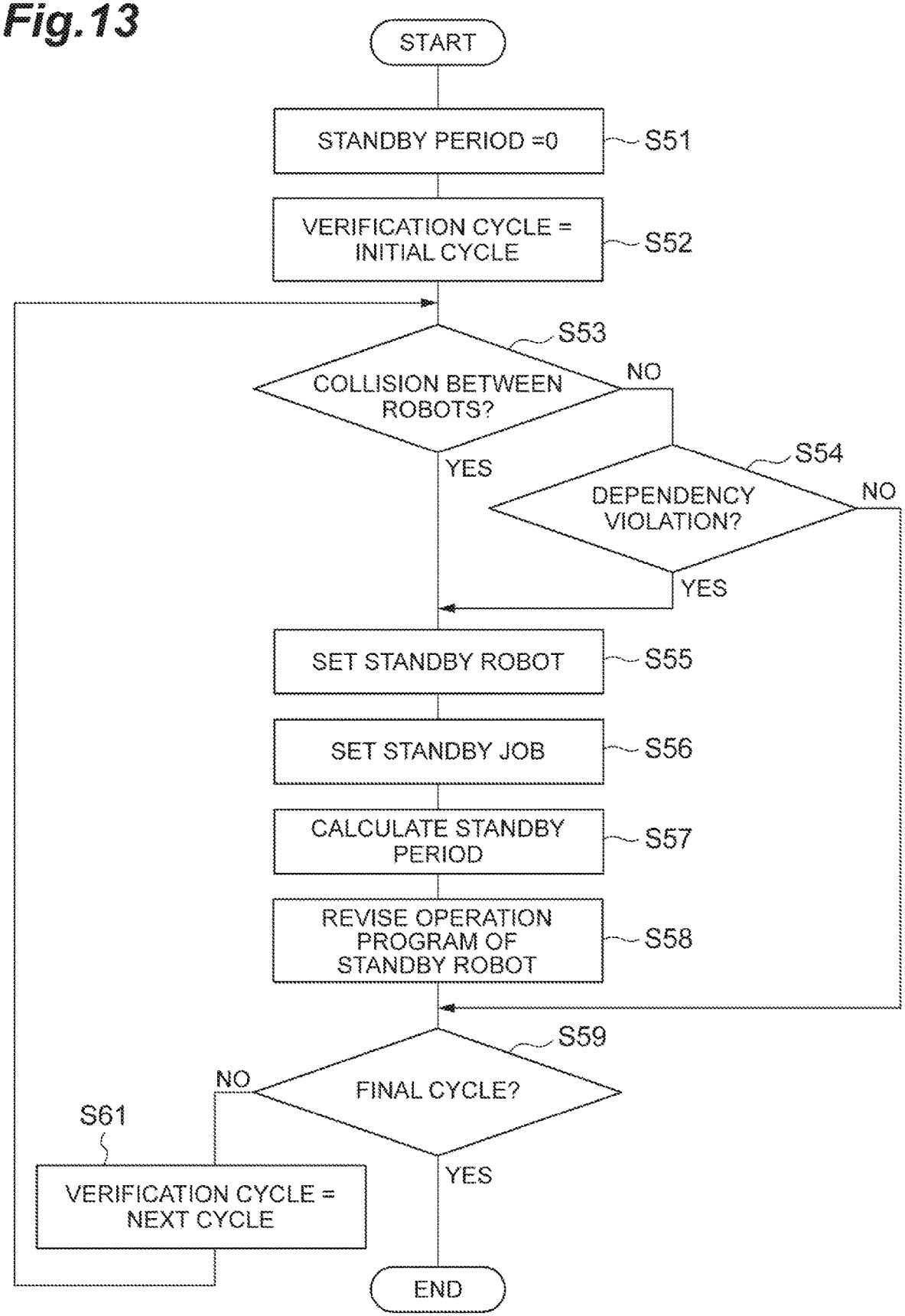
FIG. 13 is a flowchart illustrating an example standby period setting procedure.

FIG. 13 illustrates an example standby period calculation procedure of step S26. As illustrated in FIG. 13, the programming assistance device 100 first executes steps S51, S52, and S53. In step S51, the standby period calculation unit 136 sets the standby period of each job at zero. In step S52, the standby period calculation unit 136 sets a standby requirement/non-requirement verification cycle at an initial control cycle. A control cycle is one cycle of control in which feedback and a deviation-based instruction output are periodically repeated.

In step S53, the standby period calculation unit 136 confirms whether there are collisions between the robots 2 in the verification cycle. The standby period calculation unit 136 outputs, to the simulator 150, the target position and target attitude of the tip part 12 of each robot 2 in the verification cycle and causes the simulator 150 to determine the existence of collisions between the robots 2.

If it is determined in step S53 that there are no collisions between the robots 2 in the verification cycle, the programming assistance device 100 executes step S54. In step S54, the standby period calculation unit 136 confirms whether or not there is a work job started before completion of the required prior job.

If it is determined in step S53 that there is a collision between the robots 2 in the verification cycle or if it is determined in step S54 that there is a work job started before completion of the required prior job, the programming assistance device 100 executes steps S55, S56, S57, and S58. In step S55, the standby period calculation unit 136 selects a robot 2 whose operation is placed on standby (hereinafter called the "standby robot"). For example, if a collision between the robots 2 is detected, the standby period calculation unit 136 takes either one of the robots 2 as the standby robot. Furthermore, if a work job started before completion of the required prior job is detected, the standby period calculation unit 136 takes the robot 2 executing this work job as the standby robot.

In step S56, the standby period calculation unit 136 sets the job executed in the verification cycle by the selected robot 2 as a standby job. In step S57, the standby period calculation unit 136 sets the standby period of the selected standby job. In the case of standby to avoid collisions between the robots 2, the standby period calculation unit 136 uses, as the standby period, a period until completion of a job executed in the verification cycle by the other robot 2 implicated in the collision, for example. In the case of standby to satisfy dependency, the standby period calculation unit 136 uses, as the standby period, the period until the other robot 2 completes the required prior job. If an interval after the required prior job has been set, the standby period calculation unit 136 uses, as the standby period, the period until the interval has elapsed after the other robot 2 completes the required prior job. In step S58, the standby period calculation unit 136 revises the operation program of the standby robot by inserting the standby period set in step S57 before the standby job set in step S56.

The programming assistance device 100 then executes step S59. If it is determined in step S54 that there is no work job started before completion of the required prior job, the programming assistance device 100 executes step S59 without executing steps S55, S56, S57, and S58. In step S59, the standby period calculation unit 136 confirms whether the verification cycle is the final control cycle.

If it is determined in step S59 that the verification cycle is not the final control cycle, the programming assistance device 100 executes step S61. In step S61, the standby period calculation unit 136 changes the verification cycle to the next control cycle. Thereafter, the programming assistance device 100 returns the processing to step S53. Subsequently, until the verification of the final control cycle is complete, the determination of the requirement/non-requirement of the standby period and the calculation of the standby period where necessary are repeated. If it is determined in step S59 that the verification cycle is the final control cycle, the standby period calculation procedure is complete.

(Execution Order Change Procedure)

Figure 14:
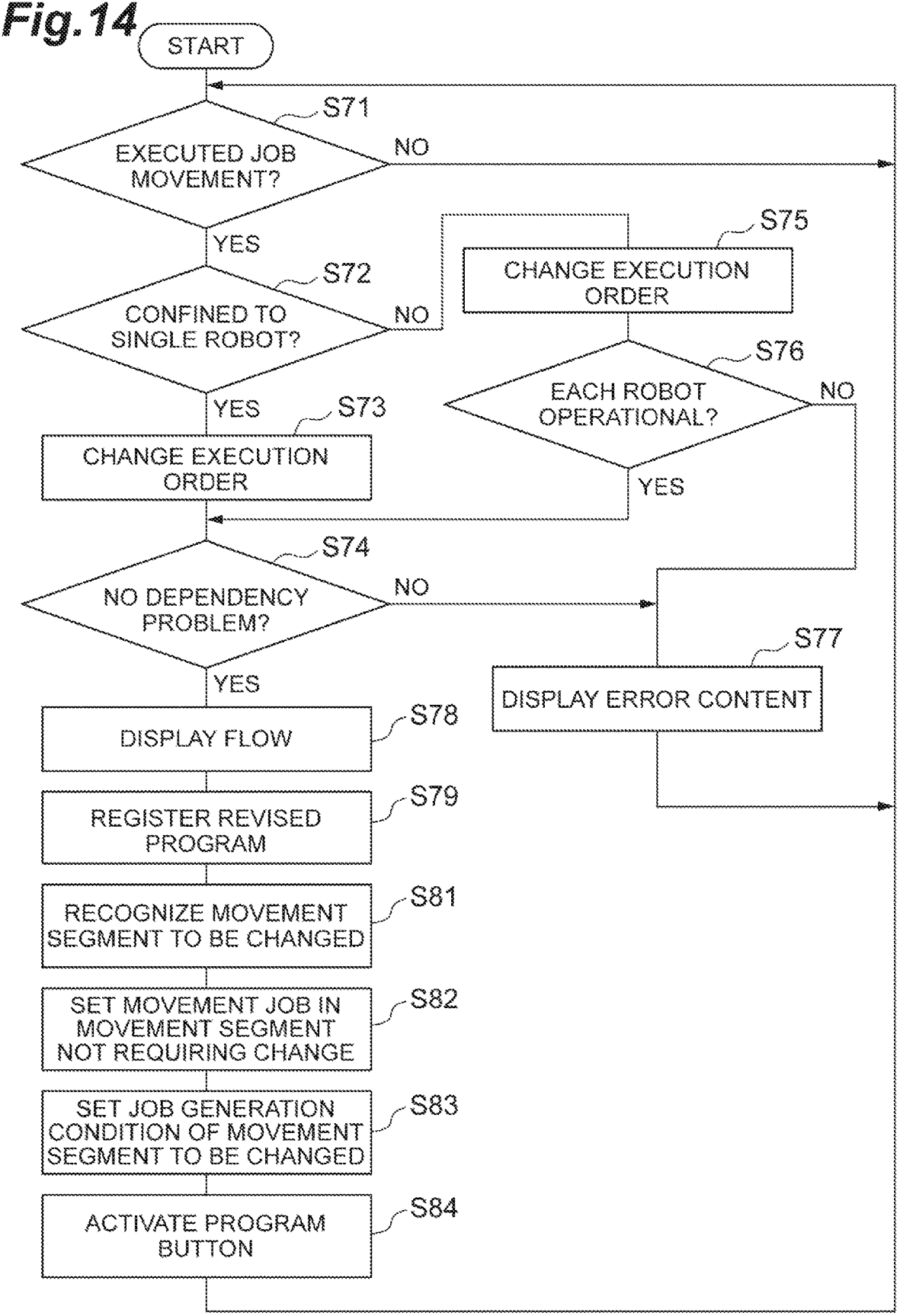
FIG. 14 is a flowchart illustrating an example execution order changing procedure.

FIG. 14 illustrates an example execution order change procedure that is performed in response to an input via the flow display window 220. As illustrated in FIG. 14, the programming assistance device 100 first executes steps S71 and S72. In step S71, the interface unit 120 awaits an input to move the work block 222 (that is, the foregoing input to move the executed job) within the flow display window 220. In step S72, the execution order setting unit 131 confirms whether or not the movement of the executed job is movement confined to a single robot 2.

If it is determined in step S72 that the executed job movement is movement confined to a single robot 2, the programming assistance device 100 executes steps S73 and S74. In step S73, the execution order setting unit 131 changes the execution order of a single robot 2 (the foregoing revision target robot) relating to movement of the executed job in response to an input to move the executed job. In step S74, the executability checking unit 132 confirms whether there is an executed job not satisfying dependency.

If it is determined in step S72 that the executed job movement is not movement confined to a single robot 2, the programming assistance device 100 executes steps S75 and S76. In step S75, the execution order setting unit 131 changes the execution order of two robots 2 (the foregoing revision target robots) pertaining to the movement of the executed job in response to an input to move the executed job.

In step S76, the executability checking unit 132 determines, for each of the two revision target robots, whether execution of a plurality of executed jobs is possible according to the execution order (the changed order) changed by the execution order setting unit 131, based on the motion constraint of each of the two revision target robots. For example, the executability checking unit 132 causes the simulator 150 to calculate the operating angles of the joints 31, 32, 33, 34, 35, and 36 for moving the tip part 12 according to the executed job and acquires, from the simulator 150, the result of determining whether or not the calculation result lies within the movable angle.

If it is determined in step S76 that the execution of the plurality of executed jobs is possible according to the changed order, the programming assistance device 100 advances the processing to step S74.

If it is determined in step S74 that there is an executed job not satisfying dependency or it is determined in step S76 that execution of the plurality of executed jobs according to the changed order is not possible, the programming assistance device 100 executes step S77. In step S77, the executability checking unit 132 causes the interface unit 120 to display an error message containing information indicating which of the conditions in a particular executed job does not satisfy. Thereafter, the programming assistance device 100 returns the processing to step S71.

If it is determined in step S74 that there is no executed job not satisfying dependency, the programming assistance device 100 executes steps S78, S79, S81, S82, S83, and S84. In step S78, the executability checking unit 132 uses the interface unit 120 to display, in the flow display window 220 and according to the changed order, a flowchart for each of the revision target robots.

In step S79, the executability checking unit 132 saves, in the program storage unit 115 as the operation program of the revision target robots, a program obtained by inserting the plurality of executed jobs between the operation start job and the operation end job according to the changed order. Accordingly, a post-revision operation program (the "post-revision program") of the revision target robots is provisionally generated.

In step S81, the revision location recognition unit 138 recognizes a revision necessary location in which transitional job regeneration according to the change of the execution order by the execution order setting unit 131 is required and a revision unnecessary location in which transitional job regeneration is not required. For example, the revision location recognition unit 138 confirms whether or not the same movement segment exists in the pre-revision program for each of the movement segments of the post-revision program. If a movement segment which is the same as the movement segment of the post-revision program does not exist in the pre-revision program, the revision location recognition unit 138 recognizes this movement segment as a revision necessary location. If a movement segment which is the same as the movement segment of the post-revision program exists in the pre-revision program, the revision location recognition unit 138 recognizes this movement segment as a revision unnecessary location.

In step S82, the revision location recognition unit 138 inserts the same transitional job as in the pre-revision program into the movement segment recognized as a revision unnecessary location. In step S83, the generation condition setting unit 133 changes the transitional job generation condition as a preset initial condition, for each of the movement segments recognized as revision necessary locations by the revision location recognition unit 138, and saves the transitional job generation condition in the generation condition storage unit 134. In step S84, the interface unit 120 activates the program creation button 213. Thereafter, the programming assistance device 100 returns the processing to step S71.

When the program creation button 213 activated in step S84 is pressed, the programming assistance device 100 executes the foregoing program generation procedure once again. In the program generation procedure described above, the transitional job generation unit 135 regenerates a transitional job of a movement segment where a transitional job does not exist without regenerating a transitional job of a movement segment where a transitional job exists. Hence, a transitional job of a revision necessary location is regenerated without a transitional job of a revision unnecessary location being regenerated.

(Generation Condition Change Procedure)

Figure 15:
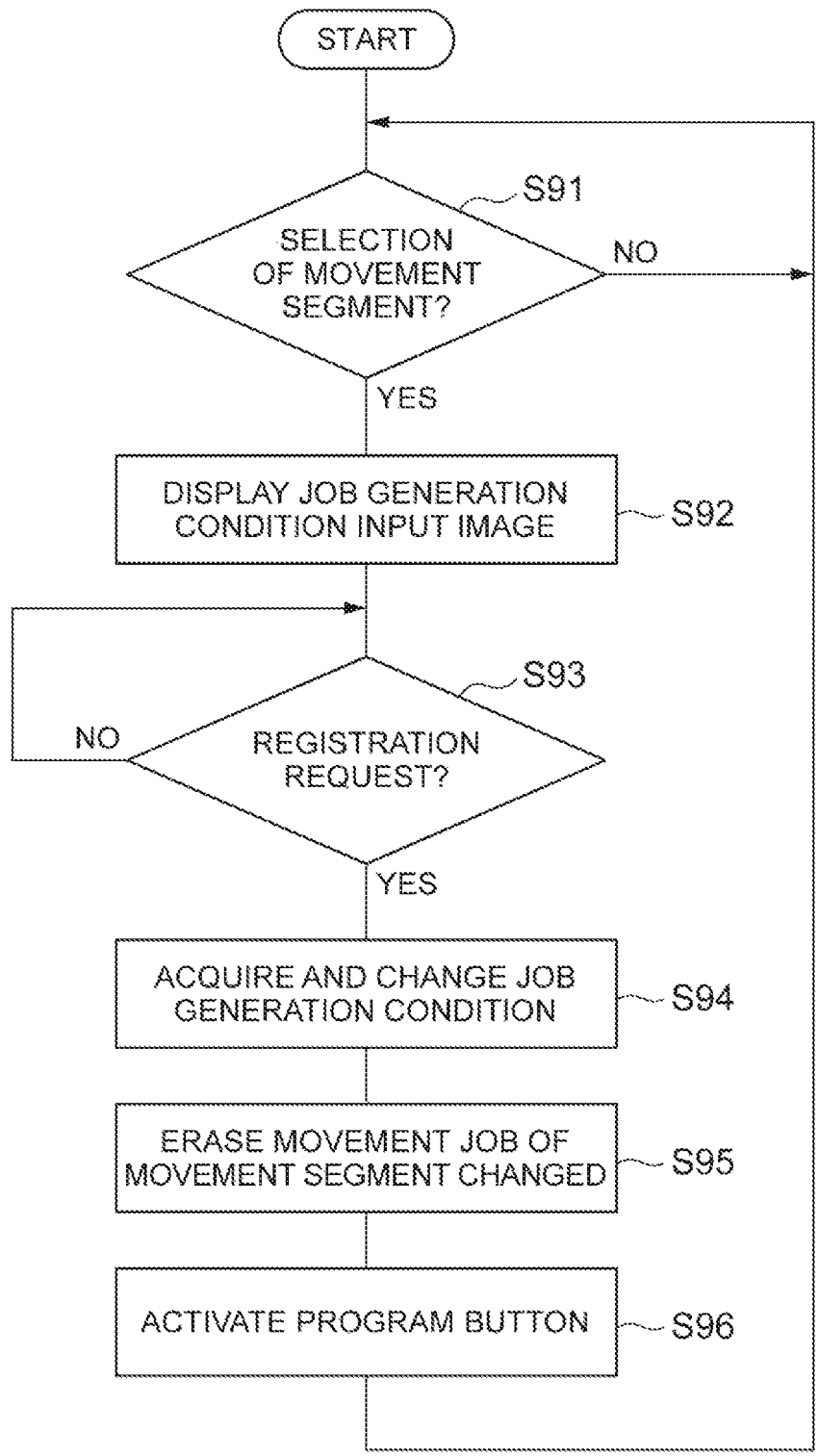
FIG. 15 is a flowchart illustrating an example generation condition change procedure.

FIG. 15 illustrates an example generation condition change procedure that is performed in response to an input via the flow display window 220. As illustrated in FIG. 15, the programming assistance device 100 executes steps S91, S92, S93, S94, S95, and S96. In step S91, for example, the generation condition change unit 137 waits for an input to be made (for example, clicking of the movement line 223) to select a transitional job in an upper image of the flow display window 220. In step S92, the generation condition change unit 137 causes the interface unit 120 to display a generation condition input image for the selected transitional job.

In step S93, the generation condition change unit 137 awaits the issuance of a generation condition registration request (waits for the registration button to be pressed, for example) via the generation condition input image. In step S94, the generation condition change unit 137 changes the generation condition of the transitional job based on an input to the generation condition input image. For example, the generation condition change unit 137 sets the generation condition of the transitional job based on the input to the generation condition input image and overwrites the generation condition storage unit 134. In step S95, the generation condition change unit 137 erases, from the program storage unit 115, the transitional job whose generation condition has been changed. In step S96, the interface unit 120 activates the program creation button 213. Thereafter, the programming assistance device 100 returns the processing to step S91.

When the program creation button 213 activated in step S96 is pressed, the programming assistance device 100 executes the foregoing program generation procedure once again. In the program generation procedure described above, the transitional job generation unit 135 regenerates a transitional job of a movement segment where a transitional job does not exist without regenerating a transitional job of a movement segment where a transitional job exists. Hence, for a movement segment from which a transitional job has been erased by the generation condition change unit 137, the transitional job is regenerated based on the changed generation condition.

(Time Designation Image Display Procedure)

Figure 16:
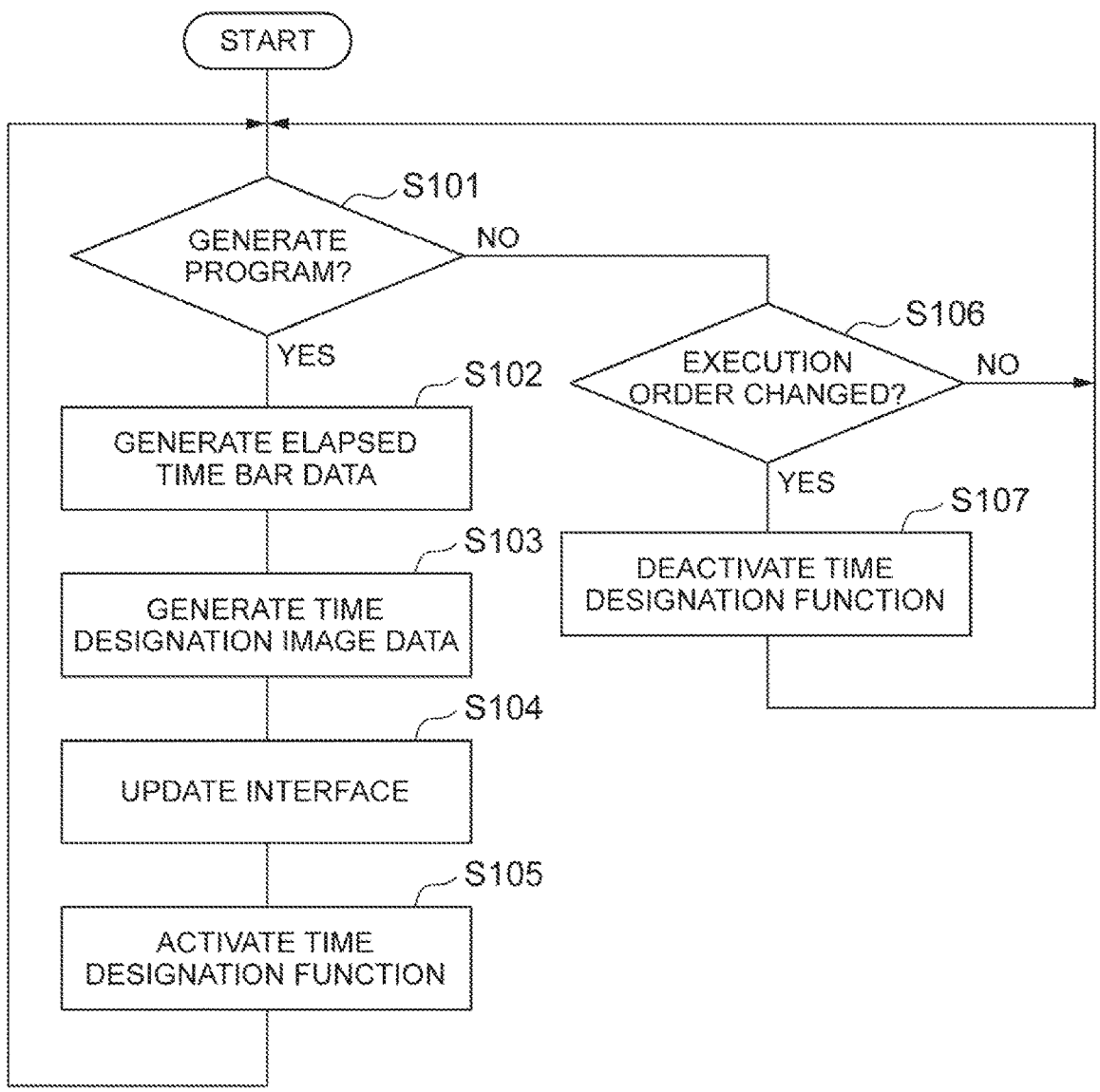
FIG. 16 is a flowchart illustrating an example time designation image display procedure.

FIG. 16 illustrates an example time designation image display procedure according to the generation and revision of the operation program. As illustrated in FIG. 16, the programming assistance device 100 first executes step S101. In step S101, the time designation image generation unit 141 confirms whether a new operation program has been generated in the program storage unit 115.

If it is determined in step S101 that a new operation program has been generated in the program storage unit 115, the programming assistance device 100 executes steps S102, S103, S104, and S105. In step S102, the time designation image generation unit 141 generates, for each of the plurality of robots 2, display data of the elapsed time bar 231 based on the execution order set by the execution order setting unit 131, the transitional job generated by the transitional job generation unit 135, and the execution standby period calculated by the standby period calculation unit 136. In step S103, the time designation image generation unit 141 generates the data of the time designation image in the timeline window 230 based on the display data of the elapsed time bar 231. In step S104, the time designation image generation unit 141 uses the interface unit 120 to display, in the timeline window 230, the time designation image according to the generated data.

In step S105, the interface unit 120 activates the timeline window 230. Thus, verification time designation through movement of the cursor 232 and operation of the playback button 233 and stop button 234 are enabled. Thereafter, the programming assistance device 100 returns the processing to step S101.

If it is determined in step S101 that a new operation program has not been generated in the program storage unit 115, the programming assistance device 100 executes step S106. In step S106, the interface unit 120 confirms whether or not the execution order has been changed by the execution order setting unit 131. If it is determined in step S106 that the execution order has not been changed, the programming assistance device 100 returns the processing to step S101.

If it is determined in step S106 that the execution order has been changed, the programming assistance device 100 executes step S107. In step S107, the interface unit 120 deactivates the timeline window 230. Thus, verification time designation through movement of the cursor 232 and operation of the playback button 233 and stop button 234 are prohibited. Thereafter, the programming assistance device 100 returns the processing to step S101.

When generation of the operation program is detected again in step S101 after the execution order has been changed, the time designation image generation unit 141 updates the elapsed time bar 231 based on the execution order changed by the execution order setting unit 131, the transitional job regenerated by the transitional job generation unit 135, and the execution standby period changed by the standby period calculation unit 136 (steps S102, S103, S104). Furthermore, the interface unit 120 re-activates the timeline window 230 (step S105). As described hereinabove, updating of the time designation image in accordance with revision of the operation program is continued.

(Procedure for Displaying Job Image and Simulation Image at Verification Target Time)

Figure 17:
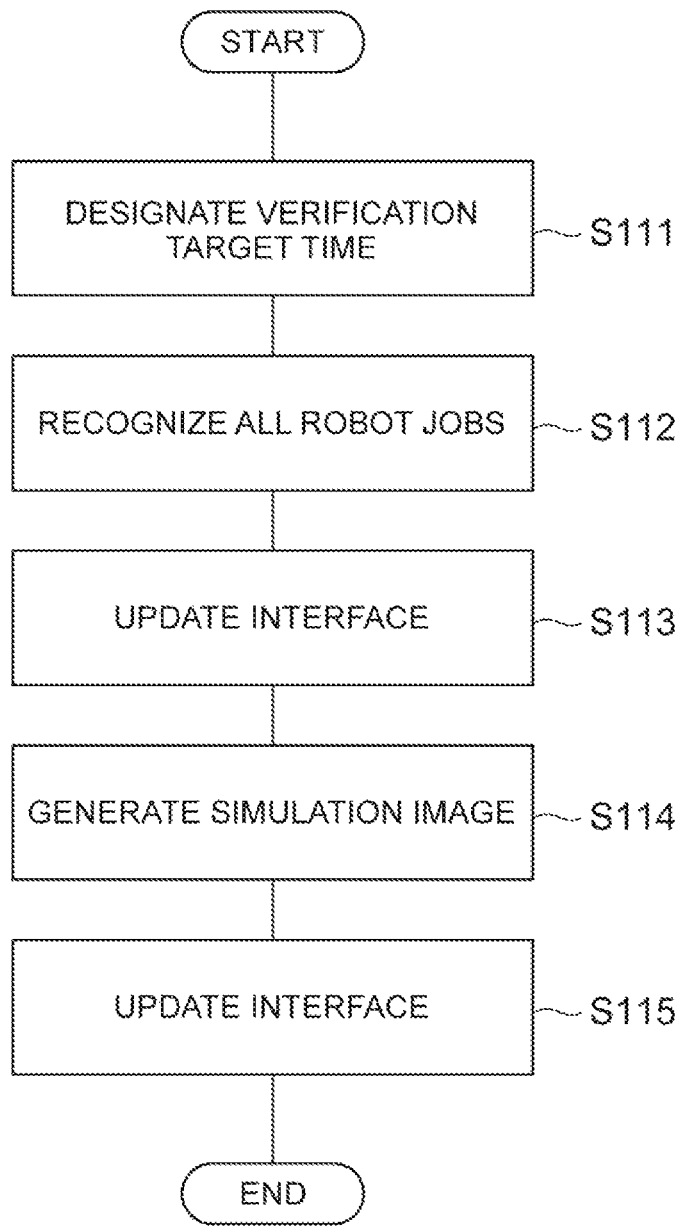
FIG. 17 is a flowchart illustrating an example job image display procedure.

FIG. 17 illustrates an example procedure for displaying a job image and a simulation image in response to an input to move the cursor 232. As illustrated in FIG. 17, the programming assistance device 100 executes steps S111, S112, S113, S114, and S115. In step S111, the time designation unit 142 designates the verification target time according to the position of the cursor on the time designation image. In step S112, the job image generation unit 143 recognizes, based on the operation program stored by the program storage unit 115, a job executed by a plurality of robots 2 at the verification target time. In step S113, the job image generation unit 143 uses the interface unit 120 to display, in the flow display window 220, a marker 225 indicating the recognized job.

In step S114, the simulation image generation unit 144 causes the simulator 150 to generate a simulation image of the plurality of robots 2 at the verification target time. In step S115, the simulation image generation unit 144 acquires the data of the simulation image generated by the simulator 150 and uses the interface unit 120 to display, in the simulation window 240, the simulation image according to the data. The procedure for displaying a job image and a simulation image at the verification target time is completed as outlined hereinabove.

(Procedure for Moving-Image Playback of Job Image and Simulation Image)

Figure 18:
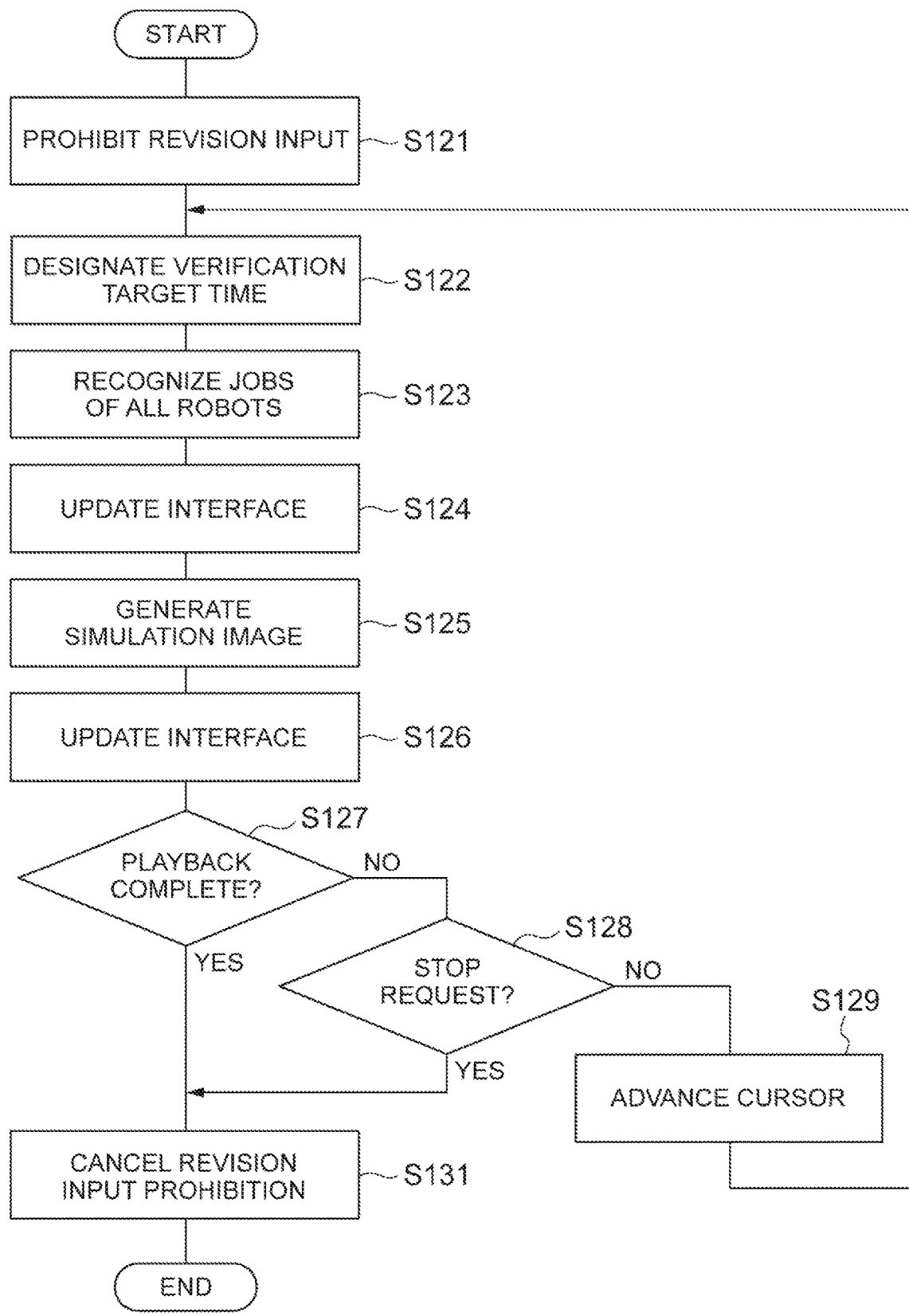
FIG. 18 is a flowchart illustrating an example operation playback procedure.

FIG. 18 illustrates an example procedure for moving-image playback of a job image and a simulation image when the playback button 233 is pressed. As illustrated in FIG. 18, the programming assistance device 100 first executes steps S121, S122, S123, S124, S125, S126, and S127. In step S121, the interface unit 120 prohibits movement, in the flow display window 220, of the work block 222, and changing of the generation condition thereof. In step S122, the time designation unit 142 designates the verification target time according to the position of the cursor on the time designation image. In step S123, the job image generation unit 143 recognizes, based on the operation program stored by the program storage unit 115, jobs executed by a plurality of robots 2 at the verification target time. In step S124, the job image generation unit 143 uses the interface unit 120 to display, in the flow display window 220, markers 225 indicating the recognized jobs.

In step S125, the simulation image generation unit 144 causes the simulator 150 to generate a simulation image of the plurality of robots 2 at the verification target time. In step S126, the simulation image generation unit 144 acquires the data of the simulation image generated by the simulator 150 and uses the interface unit 120 to display, in the simulation window 240, the simulation image according to the data. In step S127, the playback processing unit 145 confirms whether or not the cursor 232 has reached the end of the elapsed time bar 231 (the lower end illustrated in FIG. 3).

If it is determined in step S127 that the cursor 232 has not reached the end of the elapsed time bar 231, the programming assistance device 100 executes step S128. In step S128, the interface unit 120 confirms whether or not the stop button 234 has been pressed.

If it is determined in step S128 that the stop button 234 has not been pressed, the programming assistance device 100 executes step S129. In step S129, the playback processing unit 145 advances the cursor 232 by one (advances the cursor 232 in the direction of elapsed time) at a predetermined pitch. Thereafter, the programming assistance device 100 returns the processing to step S122. Subsequently, until the cursor 232 reaches the end or the stop button 234 is pressed, advancement of the cursor 232 and the updating of the job image and simulation image are repeated.

If it is determined in step S127 that the cursor 232 has reached the end of the elapsed time bar 231 or it is determined in step S128 that the stop button 234 has been pressed, the programming assistance device 100 executes step S131. In step S131, the interface unit 120 cancels the prohibition on movement, in the flow display window 220, of the work block 222, and the prohibition on changing the generation condition thereof. The moving image playback procedure is completed as outlined hereinabove.

As described hereinabove, the programming assistance device 100 comprises a program storage unit 115 configured to store, for each of a plurality of robots, an operation program that includes a plurality of jobs; and a job image generation unit 143 which, if a verification target time is designated by a user, is configured to generate, based on the operation program, a job image indicating jobs executed by a plurality of robots 2 at the verification target time.

The execution time of the plurality of jobs may not be fixed and the plurality of jobs may include at least two jobs having execution periods which are different from each other. For example, each job performed by a robot may comprise a plurality of operating commands arranged in chronological order. The operating command may designate a target position and a movement speed. The time that it takes the robot to complete the operating command may be a function of the distance to the target position from the current position of the robot, and the movement speed. Accordingly, when a first robot and a second robot each perform different jobs, the jobs may be completed at different times even if the jobs have the same number of commands. It may therefore be difficult to ascertain the relationship between the operations of a plurality of robots 2 simply by indicating, for each of the robots 2, the execution order of a plurality of jobs or commands. The jobs positioned in the same order in the operation program of the plurality of robots 2 may be executed at different times. In some examples, the programming assistance device 100 may be configured to generate a job display image indicating the jobs executed by the plurality of robots 2 at the designated verification target time. Thus, the user can readily ascertain the relationship between the operations of the robots 2. Therefore, the operation programming of the plurality of robots 2 is effectively optimized.

The programming assistance device 100 may further comprise a simulation image generation unit 144 configured to generate a simulation image of a plurality of robots 2 at the verification target time by performing an operation simulation based on an operation program; and an interface unit 120 configured to generate a user interface that includes a job image and the simulation image. In this case, the user is also able to readily ascertain the relationship between the robots 2 by adding the simulation image at the verification target time. Therefore, the operation programming of the plurality of robots 2 is more effectively optimized.

The job image generation unit 143 may also generate a job image so as to indicate, for each of the plurality of robots 2, a flowchart in which a plurality of jobs are arranged in execution order, and a marker 225 indicating a part, in the flowchart, that is executed at the verification target time. In this case, the jobs at the verification target time are displayed together with preceding and subsequent jobs in order to visually ascertain editing locations which are effective for fine-tuning the operation program. Therefore, the operation programming of the plurality of robots 2 is more effectively optimized.

The programming assistance device 100 may further comprise an execution order setting unit 131 configured to set, for each of a plurality of robots 2, an execution order of a plurality of work jobs; and a transitional job generation unit 135 configured to generate, for the plurality of robots, a transitional job between the plurality of work jobs based on the execution order set by the execution order setting unit 131, wherein the job image generation unit 143 may generate a job image indicating, for each of the plurality of robots 2, a flowchart that includes a plurality of work blocks 222 indicating the plurality of work jobs respectively and movement lines 223 indicating the transitional jobs. Accordingly, the editing locations which are effective for fine-tuning the operation program may be visually ascertained. Therefore, the operation programming of the plurality of robots 2 is more effectively optimized.

The programming assistance device 100 may further comprise a time designation image generation unit 141 configured to generate a time designation image that includes a cursor 232 indicating a position in a direction representing a time axis and a time designation unit 142. The time generation unite 142 may be configured to designate the verification target time according to the position of the cursor 232 in the time designation image, and the interface unit 120 may generate a user interface that further includes the time designation image to facilitate the designation of the verification target time. Therefore, the operation programming of the plurality of robots 2 is more effectively optimized.

The programming assistance device 100 may further comprise a standby period calculation unit 136 configured to calculate, for each of a plurality of robots 2, the respective execution standby periods of a plurality of jobs to adjust the relative operation timing of the plurality of robots 2. In some examples, the time designation image generation unit 141 may be configured to generate a time designation image that further includes, for each of the plurality of robots 2, an elapsed time bar 231 indicating, along a time axis, a job execution period and a job execution standby period. In order to fine-tune the operation program so that the plurality of robots 2 operate efficiently, the primary cause of a job execution standby period being generated may be ascertained. On the other hand, in some examples a time designation image further includes, for each of the plurality of robots 2, an elapsed time bar 231 indicating, along a time axis, a job execution period and a job execution standby period. Thus, the positions to serve as verification target times can be readily filtered in order to facilitate the designation of the filtered positions from the disposition of the cursor 232. Therefore, the operation programming of the plurality of robots 2 is more effectively optimized.

The time designation image generation unit 141 may also generate a time designation image to further indicate, on the elapsed time bar 231, an execution period of the work job and an execution period of the transitional job. In this case, filtering of the positions to be designated as a verification target time is more straightforward.

The programming assistance device 100 may further comprise a generation condition change unit 137 configured to individually change the transitional job generation condition in response to an input to the job image, wherein the transitional job generation unit 135 may regenerate, based on the changed generation condition, the transitional job corresponding to the generation condition changed by the generation condition change unit 137. In some examples, the transitional job generation condition may be changed in order to efficiently fine-tune the transitional job. Therefore, the operation programming of the plurality of robots 2 is more effectively optimized.

The execution order setting unit 131 may change the execution order of at least one robot 2 in response to the input for moving the work job in the job image, and the transitional job generation unit 135 may also regenerate at least one transitional job according to the execution order changed by the execution order setting unit. In some examples, the execution order change and transitional job regeneration can be performed by moving the work jobs in the job image. Hence, editing and verification of the operation program can be efficiently repeated. Therefore, the operation programming of the plurality of robots 2 is more effectively optimized.

The execution order setting unit 131 may change the execution order of two robots 2 pertaining to the movement of the work job in response to an input for moving the work job between two flowcharts in the job image, and the transitional job generation unit 135 may regenerate, for the two robots 2, at least one transitional job according to the execution order changed by the execution order setting unit 131. In some examples, by moving the work jobs in the job image, the allocation of work jobs to the plurality of robots 2 can be changed and the execution order change and transitional job regeneration can be performed accordingly. Therefore, the operation programming of the plurality of robots 2 is more effectively optimized.

The programming assistance device 100 may further comprise a revision location recognition unit 138 configured to recognize a revision necessary location in which transitional job regeneration according to the change of the execution order by the execution order setting unit 131 is required and a revision unnecessary location in which transitional job regeneration is not required. In some examples, the transitional job generation unit 135 may regenerate a transitional job of a revision necessary location without regenerating a transitional job of a revision unnecessary location. Accordingly, the processing burden of the transitional job regeneration can be alleviated. Therefore, the operation programming of the plurality of robots 2 is more effectively optimized.

The execution order setting unit 131 may change the execution order of at least one robot 2 in response to the input for moving the work job in the job image, and the transitional job generation unit 135 may regenerate at least one transitional job according to the execution order changed by the execution order setting unit 131. Additionally, the standby period calculation unit 136 may change, for each of the plurality of robots 2, the respective execution standby periods of the plurality of jobs based on the execution order changed by the execution order setting unit 131 and the transitional job regenerated by the transitional job generation unit 135. Still further, the time designation image generation unit 141 may update the elapsed time bar 231 based on the execution order changed by the execution order setting unit 131, the transitional job regenerated by the transitional job generation unit 135, and the execution standby period changed by the standby period calculation unit 136. Accordingly, editing and verification of the operation program can be more efficiently repeated. Therefore, the operation programming of the plurality of robots 2 is more effectively optimized.

The programming assistance device 100 may further comprise an executability checking unit 132 configured to determine executability of work jobs based on the motion constraint of each of the plurality of robots 2 in order to suppress or avoid inconsistent or incompatible editing inputs. Therefore, the operation programming of the plurality of robots 2 is more effectively optimized.

The programming assistance device 100 may further comprise the dependency storage unit 114 configured to store dependency between preset work jobs, wherein the executability checking unit 132 may determine the executability of the work jobs also based on dependency. Accordingly, inconsistent or incompatible editing inputs are suppressed or avoided. Therefore, the operation programming of the plurality of robots 2 is more effectively optimized.

It is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

What is claimed is:

1. A programming assistance device comprising circuitry configured to:
   execute a first program comprising a first set of time series jobs in accordance with a shared time line, wherein the first set of time series jobs varies a virtual posture of a first robot;
   execute a second program comprising a second set of time series jobs in accordance with the shared time line, wherein the second set of time series jobs varies a virtual posture of a second robot working in collaboration with the first robot;
   identify a verification target time in the shared time line based, at least in part, on a user designation;
   generate a simulated image including both the first robot and the second robot at the verification target time based on an execution of the first program and the second program;
   identify a first job of the first set of time series jobs that corresponds to the virtual posture of the first robot in the simulated image at the verification target time;
   identify a second job of the second set of time series jobs that corresponds to the virtual posture of the second robot in the simulated image at the verification target time; and
   generate a job image that indicates the first job corresponding to the virtual posture of the first robot at the verification target time by depicting a portion of the first set of time series jobs, and that indicates the second job corresponding to the virtual posture of the second robot at the verification target time by depicting a portion of the second set of time series jobs.

2. The programming assistance device according to claim 1, wherein the circuitry is further configured to:
   calculate execution periods of the first set of time series jobs based on the execution of the first program and the second program;
   calculate execution periods of the second set of time series jobs based on the execution of the first program and the second program;
   identify the first job based on a comparison between the execution periods of the first set of time series jobs and a duration of time to the verification target time in the shared time line; and
   identify the second job based on a comparison between the execution periods of the second set of time series jobs and the duration of time.

3. The programming assistance device according to claim 1, wherein the job image generated by the circuitry comprises:
   a first flowchart in which a plurality of symbols corresponds to the first set of time series jobs;
   a first marker indicating the portion of the first set of time series jobs;
   a second flowchart in which a plurality of symbols corresponds to the second set of time series jobs; and
   a second marker indicating the portion of the second set of time series jobs.

4. The programming assistance device according to claim 1,
   wherein the first program includes first work jobs to be executed in a first execution order, and each of the first work jobs define one or more predetermined work motions of the first robot,
   wherein the second program includes second work jobs to be executed in a second execution order, and each of the second work jobs define one or more predetermined work motions of the second robot, and
   wherein the circuitry is further configured to:
      generate at least one first transitional job of the first program which defines a motion of the first robot between two sequential first work jobs of the first program based on the execution of the first program; and
      generate, at least one second transitional job of the second program which defines a motion of the second robot between two sequential second work jobs of the second program based on the execution of the second program.

5. The programming assistance device according to claim 4, wherein the circuitry is further configured to:
   change the first execution order in response to determining a user request for changing the first execution order;
   re-execute the first program according to the changed first execution order; and regenerate the at least one first transitional job based on a re-execution of the first program;

change the second execution order in response to determining a user request for changing the second execution order;

re-execute the second program according to the changed second execution order; and regenerate the at least one second transitional job based on a re-execution of the second program.

6. The programming assistance device according to claim 5, wherein the circuitry is further configured to:

transmit the first program including the first work jobs rearranged in the changed first execution order and the at least one regenerated first transitional job wherein the first robot is controlled based on the transmitted first program; and transmit the second program including the second work jobs rearranged in the changed second execution order and the at least one regenerated second transitional job wherein the second robot is controlled based on the transmitted second program.

7. The programming assistance device according to claim 4, wherein the circuitry is further configured to:

identify a user-selected transitional job in the job image;

change a transitional generation condition for the user-selected transitional job according to an additional user input; and regenerate the user-selected transitional job according to the transitional generation condition changed according to the additional user input.

8. The programming assistance device according to claim 4, wherein the circuitry is further configured to:

check whether the work motions of the first robot defined by the first work jobs satisfy a motion constraint of the first robot; and check whether the work motions defined by the second work jobs satisfy a motion constraint of the second robot.

9. The programming assistance device according to claim 8, wherein the circuitry is further configured to check whether the first execution order and the second execution order satisfy a sequential operating condition associated with at least two work jobs, based on the first program and the second program.

10. The programming assistance device according to claim 4, wherein the circuitry is further configured to:

transmit the first program including the first work jobs and the at least one first transitional job, wherein the first robot is controlled based on the transmitted first program; and transmit the second program including the second work jobs and the at least one second transitional job, wherein the second robot is controlled based on the transmitted second program.

11. The programming assistance device according to claim 1, wherein the circuitry is further configured to:

generate a time designation image extending along a time elapse direction and comprising a time cursor indicating a position in the time elapse direction;

change a position of the time cursor in the time elapse direction based on user input to the time designation image; and designate the verification target time according to the position of the time cursor in the time designation image.

12. The programming assistance device according to claim 11, wherein the circuitry is further configured to:

calculate at least one standby period between two sequential jobs of the first program to adjust a relative operation timing of the first robot and the second robot based on the execution of the first program and the second program, and calculate at least one standby period between two sequential jobs of the second program to adjust the relative operation timing of the first robot and the second robot based on the execution of the first program and the second program, and wherein the time designation image generated by the circuitry further comprises:

a first time bar extending along the time elapse direction and including execution portions indicating execution periods of the first program and at least one standby portion indicating the at least one standby period of the first program; and a second time bar extending along the time elapse direction and including execution portions indicating execution periods of the second program and at least one standby portion indicating the at least one standby period of the second program.

13. The programming assistance device according to claim 12, wherein the first program includes first work jobs to be executed in a first execution order, and the first work jobs define one or more predetermined work motions of the first robot, wherein the second program includes second work jobs to be executed in a second execution order, and the second work jobs define one or more predetermined work motions of the second robot, wherein the circuitry is further configured to:

generate at least one first transitional job of the first program which defines a motion of the first robot between two sequential first work jobs of the first program based on the execution of the first program; and generate at least one second transitional job of the second program which defines a motion of the second robot between two sequential second work jobs of the second program based on the execution of the second program, wherein the execution portions of the first time bar include work execution portions indicating execution periods of the first work jobs and at least one transitional portion indicating at least one execution period of the at least one first transitional job, and wherein the execution portions of the second time bar include work execution portions indicating execution periods of the second work jobs and at least one transitional portion indicating at least one execution period of the at least one second transitional job.

14. The programming assistance device according to claim 13, wherein the circuitry is further configured to:

change the first execution order according to a user request;

re-execute the first program according to the changed first execution order;

regenerate at least one first transitional job according to the changed first execution order based on a re-execution of the first program;

recalculate the at least one standby period of the first program and the second program according to the changed first execution order based on the re-execution of the first program and the execution of the second program; and update the first time bar and the second time bar after recalculating the at least one standby period.

15. A robot system, comprising:
the programming assistance device according to claim 1;
the first robot;
the second robot; and
a controller configured to control the first robot and the second robot according to the first program and the second program.

16. A programming assistance method, comprising:
executing a first program comprising a first set of time series jobs in accordance with a shared time line, wherein the first set of time series jobs varies a virtual posture of a first robot;
executing a second program comprising a second set of time series jobs in accordance with the shared time line, wherein the second set of time series jobs varies a virtual posture of a second robot working in collaboration with the first robot;
identifying a verification target time in the shared time line based, at least in part, on a user designation;
generating a simulated image including both the first robot and the second robot at the verification target time based on an execution of the first program and the second program;
identifying a first job of the first set of time series jobs that corresponds to the virtual posture of the first robot in the simulated image at the verification target time;
identifying a second job of the second set of time series jobs that corresponds to the virtual posture of the second robot in the simulated image at the verification target time; and
generating a job image that indicates the first job corresponding to the virtual posture of the first robot at the verification target time by depicting a portion of the first set of time series jobs, and that indicates the second job corresponding to the virtual posture of the second robot at the verification target time by depicting a portion of the second set of time series jobs.

17. The programming assistance method according to claim 16, wherein the first program includes first work jobs to be executed in a first execution order, and each of the first work jobs define one or more predetermined work motions of the first robot,
wherein the second program includes second work jobs to be executed in a second execution order, and each of the second work jobs define one or more predetermined work motions of the second robot,
wherein the programming assistance method further comprises:
generating at least one first transitional job of the first program which defines a motion of the first robot between two sequential first work jobs of the first program based on the execution of the first program; and
generating at least one second transitional job of the second program which defines a motion of the second robot between two sequential second work jobs of the second program based on the execution of the second program, and
wherein the job image comprises:
a first flowchart including a plurality of first work symbols corresponding to the first work jobs arranged in the first execution order, and at least one first transition symbol corresponding to the at least one first transitional job;
a first marker indicating in the first flowchart the portion of the first set of time series jobs;
a second flowchart including a plurality of second work symbols corresponding to the second work jobs arranged in the second execution order, and at least one second transition symbol corresponding to the at least one second transitional job; and
a second marker indicating in the second flowchart the portion of the second set of time series jobs.

18. The programming assistance method according to claim 17, further comprising:
changing the first execution order, in response to determining that the first work symbols have been rearranged in the first flowchart, based on an order of the rearranged first work symbols;
re-executing the first program according to the changed first execution order;
regenerating the at least one first transitional job based on a re-execution result of the first program;
changing the second execution order, in response to determining that the second work symbols have been rearranged in the second flowchart, based on an order of the rearranged second work symbols;
re-executing the second program according to the changed second execution order; and
regenerating the at least one second transitional job based on a re-execution of the second program.

19. The programming assistance method according to claim 18, further comprising
changing the first execution order and the second execution order in response to determining that the first work symbols and the second work symbols have been rearranged by moving one of the first work symbols and the second work symbols between the first flowchart and the second flowchart.

20. The programming assistance method according to claim 18, further comprising:
identifying a pair of sequential first work jobs included in both the first execution order and the changed first execution order; and
retaining, in the changed first execution order, a transitional job included between the pair of sequential first work jobs in the first execution order.

* * * * *